United States Patent
Nakazawa et al.

(10) Patent No.: US 6,238,827 B1
(45) Date of Patent: May 29, 2001

(54) COLOR FILTER, LIQUID CRYSTAL DISPLAY PANEL, COMPUTER, AND METHOD FOR MANUFACTURING COLOR FILTER

(75) Inventors: Koichiro Nakazawa, Yokohama; Katsuhiro Shirota, Kawasaki; Takeshi Miyazaki; Akio Kashiwazaki, both of Yokohama; Masashi Hirose, Hachioji, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/333,041

(22) Filed: Jun. 15, 1999

(30) Foreign Application Priority Data

Jun. 18, 1998 (JP) .................................... 10-171404

(51) Int. Cl.$^7$ ............................. G02B 5/20; G02F 1/1335
(52) U.S. Cl. ............................. 430/7; 349/106; 347/107; 359/891
(58) Field of Search ............................. 430/7; 349/106; 347/106, 107; 359/891

(56) References Cited

U.S. PATENT DOCUMENTS

| | | | |
|---|---|---|---|
| 5,712,064 | 1/1998 | Miyazaki et al. | 430/7 |
| 5,716,739 | 2/1998 | Kashiwazaki et al. | 430/7 |
| 5,716,740 | 2/1998 | Shiba et al. | 430/7 |
| 5,726,724 | 3/1998 | Shirota et al. | 349/106 |
| 5,736,278 | 4/1998 | Nakazawa et al. | 430/7 |
| 5,898,208 | 4/1999 | Miyazaki et al. | 349/106 |
| 5,948,576 | 9/1999 | Shirota et al. | 430/7 |
| 5,948,577 | 9/1999 | Nakazawa et al. | 430/7 |

FOREIGN PATENT DOCUMENTS 10-197710 * 7/1998 (JP) .

* cited by examiner

*Primary Examiner*—John A. McPherson
(74) *Attorney, Agent, or Firm*—Fitzpatrick, Cella, Harper & Scinto

(57) ABSTRACT

It is an object of the present invention to provide a color filter with high color density and superior transparency. The color filter comprises red, green, and blue color elements. A relationship between a tristimulus value (Y) of a white color synthesized by the color elements and an area (S) for a triangle formed by connecting the xy chromaticity in the standard C light source of the above color elements each obtained based on a XYZ color system with a 2° visual field (JIS Z8701) meets the condition of $Y \geq -255*S+54$.

17 Claims, 6 Drawing Sheets

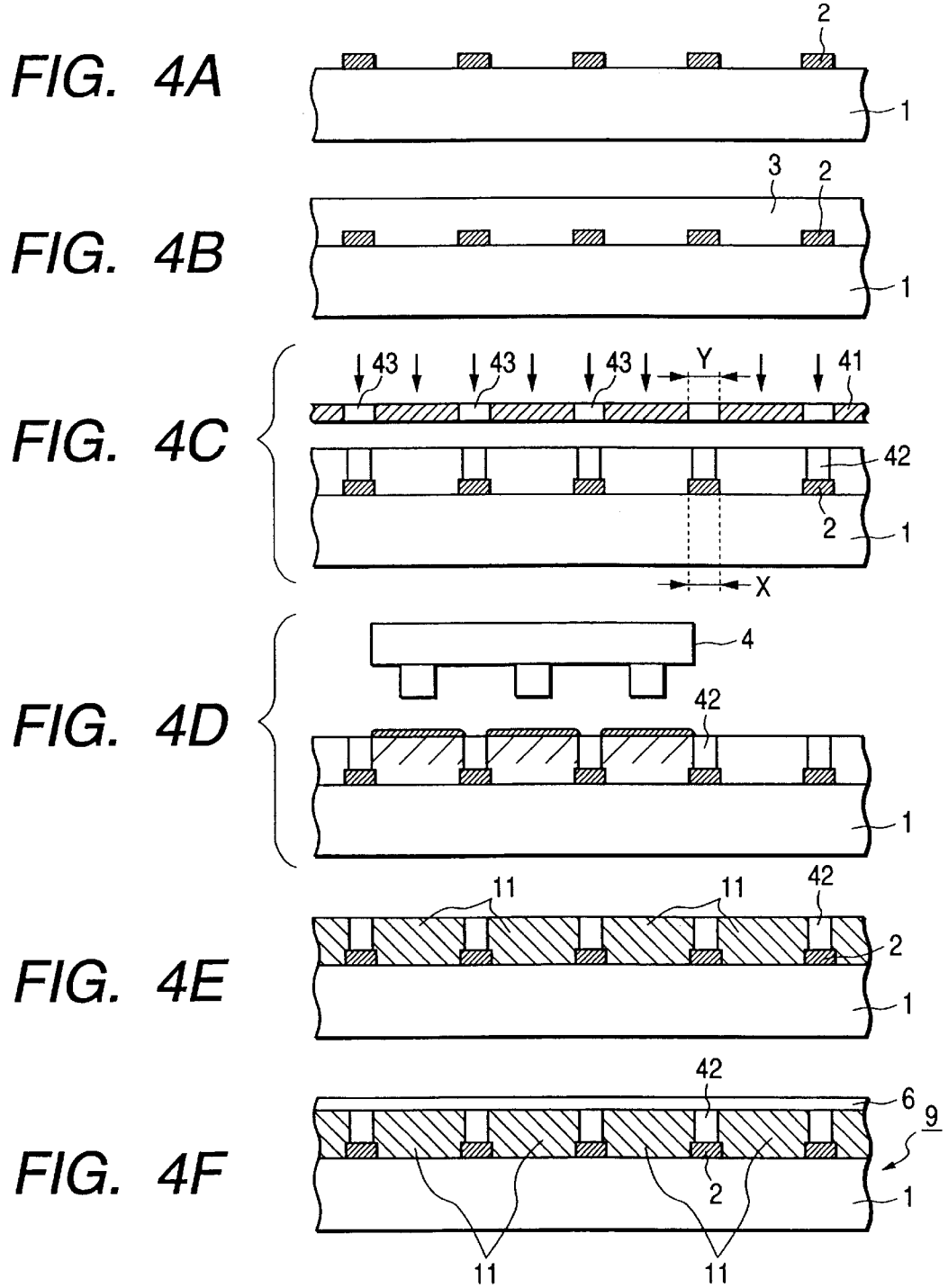

COLOR FILTER, LIQUID CRYSTAL DISPLAY PANEL, COMPUTER, AND METHOD FOR MANUFACTURING COLOR FILTER

BACKGROUND OF THE INVENTION

1. Field of the Invention

The present invention relates to a color filter employed for a color display apparatus or the like. In particular, the present invention relates to a color filter preferable to a color television, an on-vehicle television, a personal computer, a pinball game machine board or the like, and further, a liquid crystal element using the color filter.

2. Related Background Art

A color display apparatus is configured by a light shutter and a back light represented by a color filter and a liquid crystal, and visualizes modulated light by display information. A color to be displayed is produced by attenuating unnecessary wavelength area of the back light in order to synthesize spectra by means of the color filter and the light shutter. The color filter utilizes wavelength area of a dye or a pigment. However, since transmission spectra are broad, color reproducibility with a high color purity is difficult. When the color purity is increased by concentrating the dye or pigment, the brightness of the transmitted light through the color filter is attenuated. As a result, the display is darkened, thereby making it difficult to visualize tone representation at a level close to a black. Therefore, countermeasures are taken, for example, by increasing luminance of the back light. If the luminance of the back light is increased, power consumption increases. Such increased power consumption is disadvantageous in a personal computer of notebook type, which is the main stream of a color display apparatus.

SUMMARY OF THE INVENTION

The present invention has been achieved in view of the foregoing problem. It is one object of the present invention to provide a color filter with a high color density and a superior transparency.

It is another object of the present invention to provide a liquid crystal display panel capable of displaying a high quality image such that a tone representation close to a black can be clearly visualized without increasing the luminance of back light, for example.

It is still another object of the present invention to provide a computer comprising a high quality image display section.

It is still another object of the present invention to provide a method for manufacturing a color filter with a high color density and a superior transparency.

A color filter capable of achieving the above mentioned objects is a color filter comprising red, green, and blue color elements, wherein a relationship between a tri-stimulus value (Y) of a white color synthesized by the color elements and an area (S) for a triangle formed by connecting an xy chromaticity coordinate in a standard C light source of the above color elements obtained based on a XYZ color system with a 2° visual field (JIS Z8701) meets $Y \geq -255*S+54$.

In particular, in the case where the red color element includes at least one color element selected from coloring matters indicated by the following structural formulas (R1-1), (R1-2), (R2-1), and (R2-2), the above green color element includes at least one color element selected from a phthalocyanine dye indicated by the following structural formula (G1), a phthalocyanine dye indicated by (G2), a naphthalocyanine dye indicated by (G3), and a pyrazolone dye indicated by (G4), and the above blue color element is configured so as to include at least one clolring matter selected from a porphyradine dye indicated by the following structural formula (B1) and a phthalocyanine dye indicated by (B2); a color filter obtained therewith can satisfy properties of color density and transparency, which are likely to conflict with each other, at a very high level.

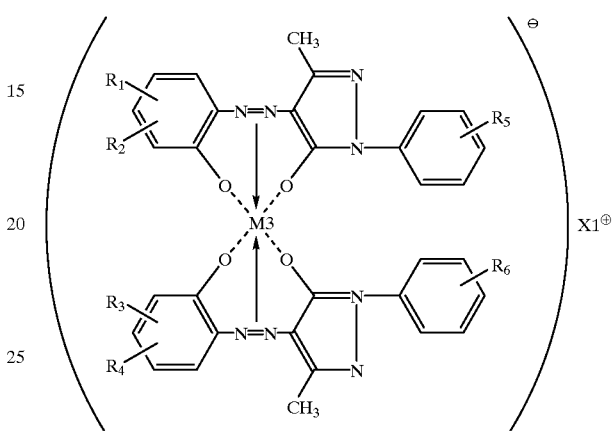

(R1-1)

(In the above general formula (R1-1), $R_1$, $R_2$, $R_3$, and $R_4$ each denote a hydrogen atom, a halogen atom, a nitro group, an alkyl group with 1 to 5 carbons, a $CF_3$ group or $SO_3$ (M1) group (M1 indicates a monovalent alkaline metal cation or $NH_4$), $R_5$ and $R_6$ each denote a hydrogen atom, a halogen atom, or a $SO_3$ (M2) group (M2 indicates a monovalent alkaline metal or $NH_4$), M3 denotes Cr, Ni, or Co, and $X1^+$ denotes a monovalent metal cation or $NH_4^+$).

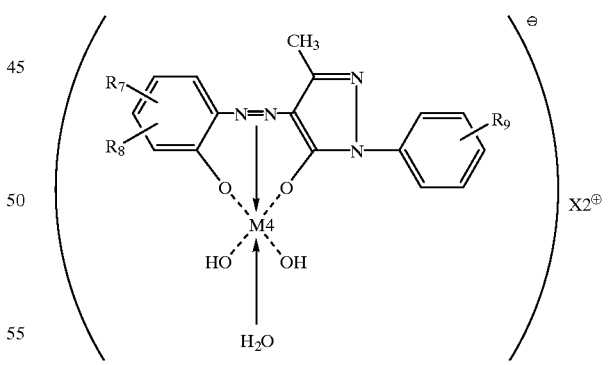

(R1-2)

(In the above general formula (R1-2), $R_7$ and $R_8$ each denote a hydrogen atom, a halogen atom, a nitro group, an alkyl group with 1 to 5 carbons, a $CF_3$ group, or $SO_3$ (M1) group (M1 indicates a monovalent alkaline metal or $NH_4$), $R_9$ denotes a hydrogen atom, a halogen atom or a $SO_3$ (M2) group (M2 indicates a monovalent alkaline metal or $NH_4$), M4 denotes Cu or Cr, and $X2^+$ denotes a monovalent alkaline metal cation or $NH_4^+$.)

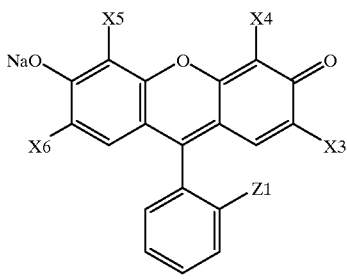
(R2-1)

(In the above formula (R2-1), X3 to X6 each denotes a halogen atom, Z1 denotes a —COO (M3) group or a —SO$_3^-$ group, and M3 denotes a monovalent alkaline metal or NH4$^+$.)

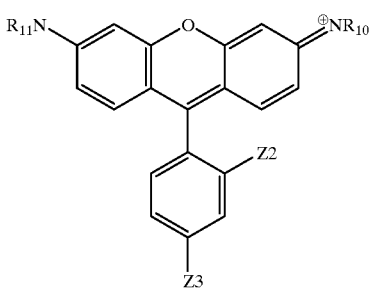
(R2-2)

(In the above formula (R2-2), R$_{10}$ and R$_{11}$ each denote a hydrogen atom, a linear or branched alkyl group with 1 to 5 carbons or a substituted or unsubstituted aryl group, Z2 and Z3 each denote a —COO (M4) group or a —SO$_3^-$ group, and M4 denotes a monovalent alkaline metal or NH$_4^+$.)

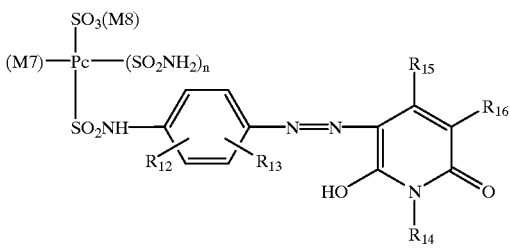
(G1)

(In the above formula (G1), Pc indicates a phthalocyanine backbone, (M7) indicates Cu, Zn, or Ni, R$_{12}$ and R$_{13}$ each indicate a hydrogen atom, SO$_3$ (M5), a substituted or unsubstituted amide group, or a substituted or unsubstituted alkyl group. R$_{14}$ and R$_{15}$ each indicate a substituted or unsubstituted alkyl group, R$_{16}$ indicates —CONHR$_{17}$, —COOH or —COO (M6), R$_{17}$ indicates a hydrogen atom or a substituted or unsubstituted alkyl group. In addition, n indicates 0, 1, or 2. M5, M6, and M8 each indicate an alkaline metal or NH4$^+$.)

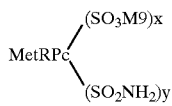
(G2)

(In the above formula (G2), Met denotes a divalent to tetravalent metal ion or two hydrogen atoms, RPc denotes a phthalocyanine residue into which 1 to 8 phenyl groups are introduced, M9 denotes a hydrogen atom, an alkaline metal, or an ammonium ion, x denotes 1 to 8, y denotes 0 to 7 (provided that x+y<8), and when Met denotes a trivalent or tetravalent metal ion, one or two ligands exist, respectively.)

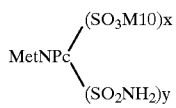
(G3)

(In the above formula (G3), Met denotes a divalent to tetravalent metal ion or two hydrogen atoms, NPc denotes a naphthalocyanine residue, M10 denotes a hydrogen atom, an alkaline metal, or an ammonium ion, x denotes 1 to 4, y denotes 0 to 3 (provided that x+y≦4), and when Met denotes a trivalent or tetravalent metal ion, one or two ligands exist, respectively.)

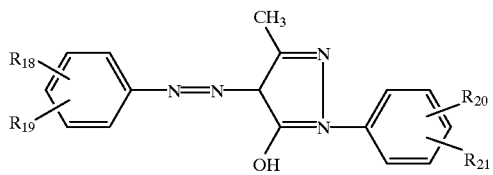
(G4)

(In the above formula (G4), R$_{18}$ and R$_{19}$ each independently indicate a hydrogen atom, a OH group, a halogen atom, a linear or branched alkyl group with 1 to 5 carbons, a nitro group, a CF$_3$ group, or a SO$_3$ (M11) group (M11 denotes a monovalent alkaline metal or NH$_4$). R$_{20}$ and R$_{21}$ both indicate SO$_3$ (M12) groups (M12 denotes a monovalent alkaline metal or NH$_4$).

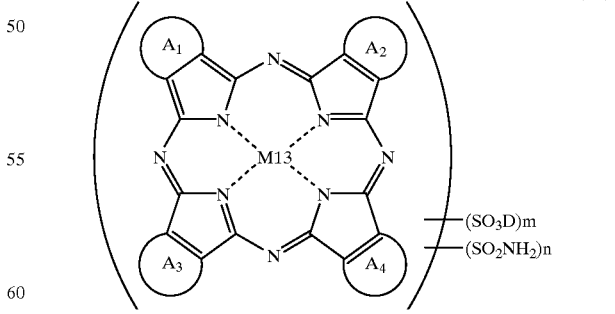
(B1)

m denotes an integer of 1 to 4,
n denotes an integer of 0 to 3, and
m+n denotes an integer of 1 to 4.
(In the above formula (B1), A$_1$ to A$_4$ each independently denotes an aromatic ring that may be substituted by a halogen atom, a nitro group, an alkyl group, an aryl group, an alkoxy group, sulfone group, or sulfoamide group; or a nitrogen-containing heteroaromatic ring that may be substituted by a sulfone group or a sulfoamido group, and at least one of $A_1$ to $A_4$ is a nitrogen-containing heterocyclic ring. M13 denotes two hydrogen atoms or a divalent metal, or a trivalent or tetravalent metal derivative, and D denotes a monovalent alkaline metal or $NH_4$.)

(B2)

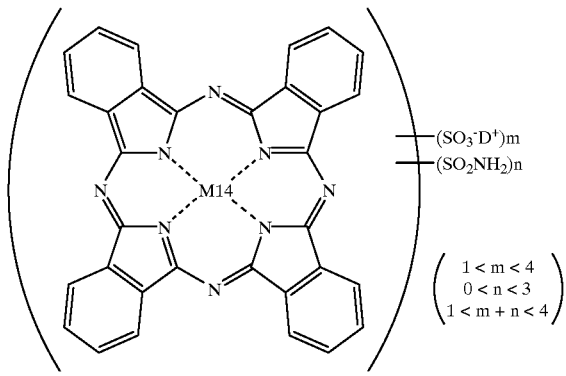

(In the above formula (B2), m and n each denote the number of substituents, D independently denotes an alkaline metal or ammonia, M14 denotes two hydrogen atoms or a divalent metal having a substituent, or a trivalent or tetravalent metal derivative.)

In addition, a liquid crystal display panel capable of achieving the foregoing objects comprises a color filter comprising red, green, and blue color elements in which a relationship between the tri-stimulus value (Y) of a white color synthesized by the color element and an area (S) for a triangle formed by connecting an xy chromaticity coordinate in a standard C light source of the above color elements obtained based on a XYZ color system with a 2° visual field (JIS Z8701) meets $Y \leq -255*S+54$, and a panel substrate disposed opposite to the color filter, wherein a liquid crystal compound is sealed between the color filter and the panel substrate.

In particular, in the case where the color filter is formed in such a way that a red color element includes at least one coloring matter selected from coloring matters indicated by the above structural formulas (R1-1), (R1-2), (R2-1), and (R2-2), a green color element includes at least one coloring matter selected from a phthalocyanine dye indicated by the above structural formula (G1), a phthalocyanine dye indicated by (G2), a naphthalocyanine dye indicated by (G3), and a pyrazolone dye indicated by (G4), and a blue color element includes at least one coloring matter selected from a porphyradine dye indicated by the above structural formula (B1) and a phthalocyanine dye indicated by (B2); an excellent tone representation can be obtained in an area close to black without increasing the luminance of back light, and, in particular, a liquid crystal display panel with high quality image can be obtained.

In addition, a computer capable of achieving the foregoing objects comprises a liquid crystal display panel as an image display section, wherein the liquid crystal display panel comprises a color filter comprising red, green, and blue color elements in which a relationship between a tristimulus value (Y) of a white color synthesized by the color elements and an area (S) of a triangle formed by connecting an xy chromaticy coordinate in a standard C light source of the above color elements obtained based on a XYZ color system with 2° visual field (JIS Z8701) meets $Y \geq -255*S+54$, and a panel substrate disposed opposite to the color filter, wherein a liquid crystal compound is sealed between the color filter and the panel substrate.

A method for manufacturing a color filter further capable of achieving the foregoing objects comprising the steps: preparing an ink jet recording red color ink including at least one pigment selected from pigments indicated by the above structural formulas (R1-1), (R1-2), (R2-1), and (R2-2); an ink jet recording green color ink including at least one pigment selected from a phthalocyanine dye indicated by the above structural formula (G1), a phthalocyanine dye indicated by (G2), a naphthalocyanine dye indicated by (G3) and a pyrazolone dye indicated by (G4); an ink jet recording blue color ink including at least one pigment selected from a porphyradine dye indicated by the above structural formula (B1) and a phthalocyanine dye indicated by (B2) is prepared; ejecting each color ink toward a surface of a light-transparent substrate using an ink jet process to apply it to a predetermined position on the substrate; and forming red, green, and blue color elements on the light-transparent substrate such that a relationship between a tristimulus value (Y) of a white color synthesized by red, green, and blue color elements and an area (S) of a triangle formed by connecting an xy chromaticity coordinate in a standard C light source of the above color elements obtained based on a XYZ color system with a 2° visual field (JIS Z8701) meets $Y \geq -255 * 5+54$.

By adopting such structure, a color filter which satisfys both of the color density and transparency at a very high level can be manufactured.

BRIEF DESCRIPTION OF THE DRAWINGS

FIG. 4A, FIG. 4B, FIG. 4C, FIG. 4D, FIG. 4E, and FIG. 4F are flow charts of a method for manufacturing a color filter according to another embodiment of the present invention;

DETAILED DESCRIPTION OF THE PREFERRED EMBODIMENTS

Figure 1:
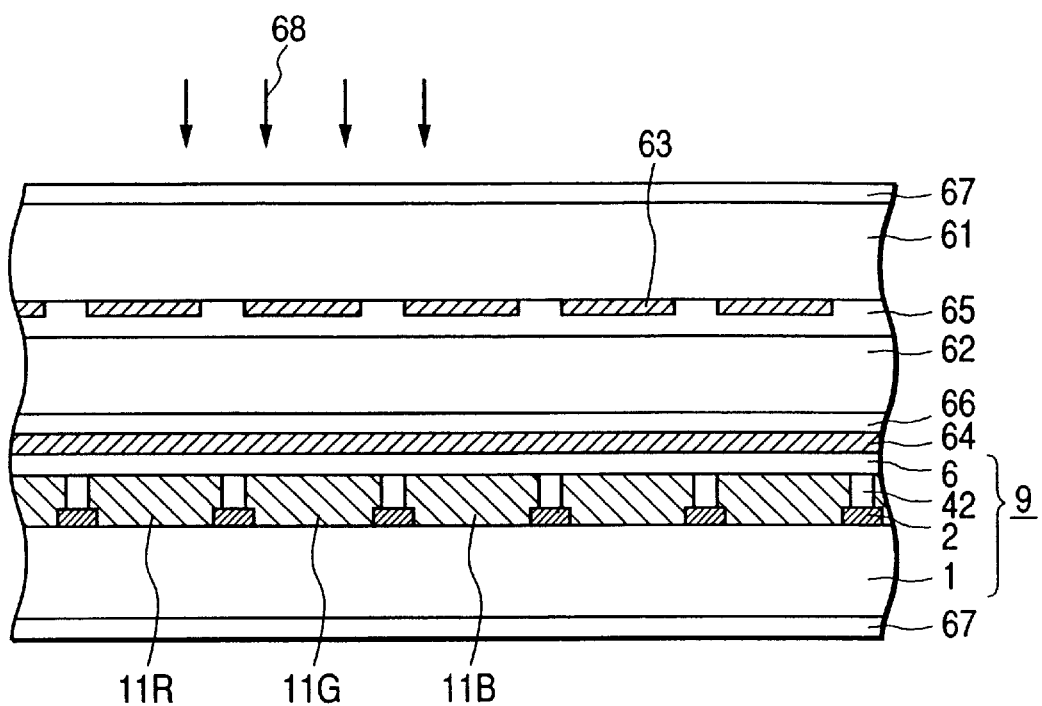
FIG. 1 is a schematic sectional view of a liquid crystal element using a color filter.

FIG. 1 is a schematic sectional view of a liquid crystal element using a color filter according to the present invention. In the figure, reference numeral 9 denotes a color filter. The color filter 9 is partitioned by an area 42 in which an ink is hardly deposited and a black matrix 2 on a transparent substrate 1, and red, green, and blue color elements (pixels) 11R, 11G, and 11B each are formed therebetween. The color filter 9 is disposed so as to be opposite to a transparent substrate 61, and a liquid crystal composition 62 is sealed therebetween. A transparent pixel electrode 63 is formed inside of the transparent substrate 61 in a matrix shape, and a transparent electrode (a common electrode) 64 is formed on a whole surface of a protective layer 6 of the color filter 9. Further, an oriented film 65 is formed so as to cover the pixel electrode 63 on the inside surface of the transparent substrate 61, and an oriented film 66 is formed on the inside surface of the common electrode 64. By rubbing these oriented films, liquid crystal molecules can be arrayed in a constant direction. On the thus fabricated liquid crystal display panel, a polarizing plate 67 is bonded with the outside of the color filter substrate 1 and the outside of the opposite substrate 61. In general, a back light with which a fluorescent lamp and a scattering plate are combined, is employed, and a liquid crystal compound functions as a light shutter for changing the transparency of the light 68 of the back light, making it possible to perform displaying.

In the present invention, it is preferred to form coloring matters 11R, 11G, and 11B so that a relationship between the tristimulus value Y of the white color synthesized by transmitting colored sections 11R, 11G, and 11B for R, G, and B of the color filter 9 and an area S of the triangle formed by connecting the xy chromaticity coordinate of R, G, and B selected so that the white color is a desired color temperature in the standard C light source obtained based on the respective XYZ color system with a 2° visual field (JIS Z8701) meets $Y \geq -255*S+54$. When the above relationship between Y and S is met to be preferably $Y \geq -255*S+54.5$, further $Y \geq -255*S+55$, further preferably $Y \geq -255*S+55.5$, and further more preferably $Y \geq -255*S+56$, there is provided a color filter capable of providing a liquid crystal display panel with a very high quality image.

The tristimulus value Y is one of the tristimulus values X, Y, and Z, and is obtained by the following formula based on a color matching function adopted in CIE (Committee of International Emission) in 1931.

$$Y = K \int_{380}^{780} S(\lambda) \bar{y}(\lambda) T(\lambda) d\lambda$$

$$K = \frac{100}{\int_{380}^{780} S(\lambda) \bar{y}(\lambda) d\lambda}$$

$S(\lambda)$: Spectrum distribution of the standard C light source
$\bar{y}(\lambda)$: Color matching function
$T(\lambda)$: Spectrum transparency of the color filter Similarly, the tristimulus values X and Z are obtained by $$Y = K \int_{380}^{780} S(\lambda) \bar{x}(\lambda) T(\lambda) d\lambda$$

$$Z = K \int_{380}^{780} S(\lambda) \bar{z}(\lambda) T(\lambda) d\lambda$$

$\bar{x}(\lambda)$ and $\bar{z}(\lambda)$: Color matching function

From the tristimulus values X, Y, and Z, the chromaticity xy are obtained by:

$$x = \frac{X}{Y+Y+Z}$$

$$y = \frac{X}{X+Y+Z}$$

The area S is an area of three points when the respective chromaticity coordinates of R, G, and B are $(x_R, y_R)$, $(x_G, y_G)$, and $(x_B, y_B)$, and the unit has no dimensions.

The color filter that meets the above relational formula can be manufactured by properly selecting the type of coloring agent, coloring method or the like, for example, when each of the colored sections 11R, 11G, and 11B are formed.

Next, the foregoing color filter that meets a relationship between Y and S according to the present invention can be obtained by forming the colored pixels of each color using a variety of coloring materials as shown below, for example.

(1) Red Color Pixel

Metal-containing azopyrazolone dye indicated by the following structural formula (R1-1) or (R1-2)

Dye having a xanthene backbone indicated by the following structural formula (R2)

(Metal-containing azopyrazolone dye)

Here, as a metal-containing azopyrazolone dye, a dye having a structure indicated by the following structural formula (R1-1) or (R1-2) is exemplified.

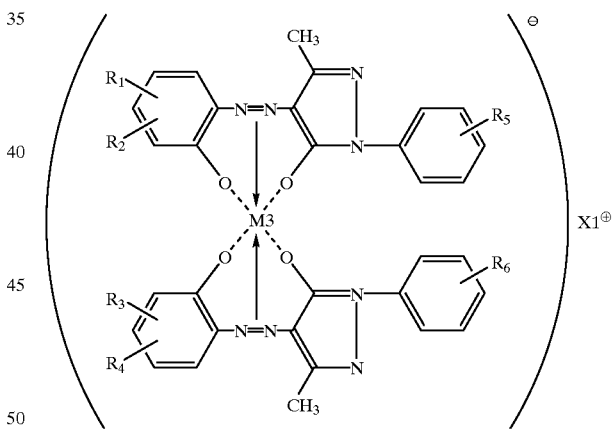

(R1-1)

In the above general formula (R1-1), $R_1$, $R_2$, $R_3$, and $R_4$ each denote a hydrogen atom, a halogen atom (for example, a fluorine atom, a chorine atom, a bromine atom or the like), a nitro group, a linear or branched alkyl group with 1 to 5 carbons, a $CF_3$ group, or $SO_3$ (M1) group (M1 indicates a monovalent alkaline metal or $NH_4$), and $R_5$ and $R_6$ each denote a hydrogen atom, a halogen atom, or $SO_3$ (M2) group (M2 indicates a monovalent alkaline metal or $NH_4$), M3 denotes Cr, Ni, or Co, and $X1^+$ denotes a monovalent alkaline metal cation or $NH4^+$.

A specific example of the metal-containing azopyrazolone dye indicated by the above formula (R1-1) is shown in table 1 below.

TABLE 1

General formula of metal-containing azopyrazolone dye R1-1

| R ink | | R1 | R2 | R3 | R4 | R5 | R6 |
|---|---|---|---|---|---|---|---|
| (R1-1) | A | SO$_3$Na | NO$_2$ | SO$_3$Na | H | H | H |
| | B | SO$_3$Na | NO$_2$ | SO$_3$Na | NO$_2$ | H | H |
| | C | SO$_3$Na | Cl | SO$_3$Na | H | H | H |
| | D | SO$_3$Na | Cl | SO$_3$Na | Cl | H | H |
| | E | SO$_3$Na | H | SO$_3$Na | H | H | H |
| | F | SO$_3$Na | CH$_3$ | SO$_3$Na | CH$_3$ | H | H |
| | G | SO$_3$Na | CH$_3$ | SO$_3$Na | H | H | H |
| | H | SO$_3$Na | CH$_3$ | SO$_3$Na | CH$_3$ | H | H |
| | I | SO$_3$Na | NO$_2$ | SO$_3$Na | H | SO$_3$Na | H |
| | J | SO$_3$Na | NO$_2$ | SO$_3$Na | H | SO$_3$Na | SO$_3$Na |
| | K | SO$_3$Na | NO$_2$ | SO$_3$Na | H | Cl | H |
| | L | SO$_3$Na | NO$_2$ | SO$_3$Na | H | SO$_3$Na | Cl |
| | M | SO$_3$Na | NO$_2$ | H | H | H | H |
| | N | SO$_3$Na | NO$_2$ | Cl | H | H | H |
| | O | SO$_3$Na | NO$_2$ | H | H | SO$_3$Na | H |

* X1 in the general formula (R1-1) is Na. M3 denotes chrome (Cr).

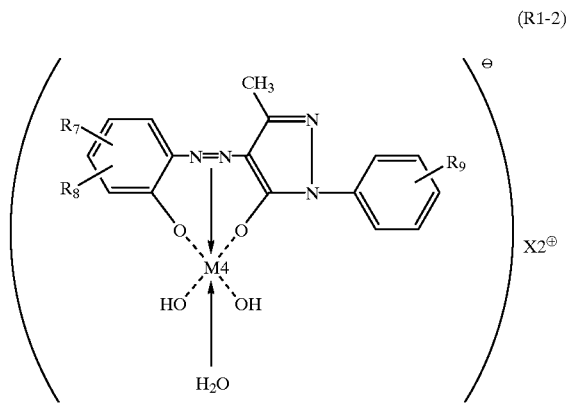

(R1-2)

In the above general formula (R1-2), R$_7$ and R$_8$ each denote a hydrogen atom, a halogen atom (for example, a fluorine atom, a chorine atom, a bromine atom, etc.), a nitro group, a linear or branched alkyl group with 1 to 5 carbons, a CF$_3$ group, or SO$_3$ (M1) group (M1 indicates a monovalent alkaline metal or NH$_4$). R$_9$ denotes a hydrogen atom, a halogen atom, or SO$_3$ (M2) group (M2 indicates a monovalent alkaline metal or NH$_4$), M4 denotes Cu or Cr, and X2$^+$ denotes a monovalent alkaline metal cation or NH4$^+$. Here, in M1 and M2, a specific example of the monovalent alkaline metal includes Na, K, and Li or the like.

(Dye having a xanthene backbone)

A dye having xanthene backbone means a dye having a xanthene structure indicated by the following general formula (R2) in a molecule.

(R2)

Specifically, a dye indicated by the following general formula (R2-1) or (R2-2) is exemplified.

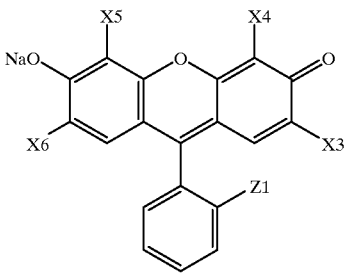

(R2-1)

In the above formula (R2-1), X3 to X6 each denote halogen atoms such as a fluorine atom, a chorine atom, a bromine atom, and an iodine atom, Z1 denotes a —COO (M3) group or —SO3$^-$ group. M3 denotes a monovalent alkaline metal such as Na, K, and Li or NH4$^+$.

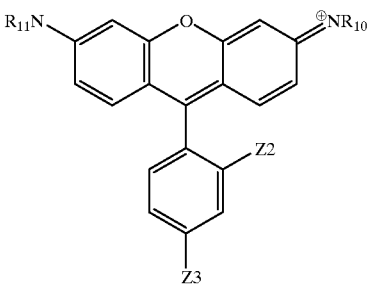

(R2-2)

In the above formula (R2-2), R$_{10}$ and R$_{11}$ each denote a hydrogen atom, a linear or branched alkyl group with 1 to 5 carbons, or a substituted or unsubstituted aryl group, and Z2 and Z3 denotes a —COO (M4) group or —SO$_3^-$ group. M4 denotes a monovalent alkaline metal such as Na, K, and Li or NH$_4^+$.

A specific example of the xanthene based pigment indicated by the above general formulas (R2-1) and (R2-2) is shown below.

C.I. Acid Red 289

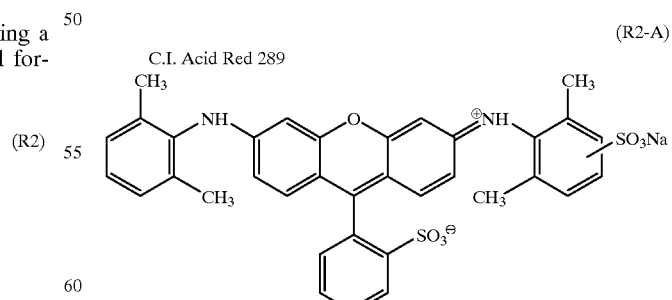

(R2-A)

C.I. Acid Red 52 (R2-B)
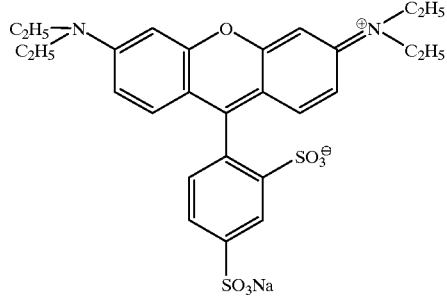
C.I. Acid Red 50 (R2-C)
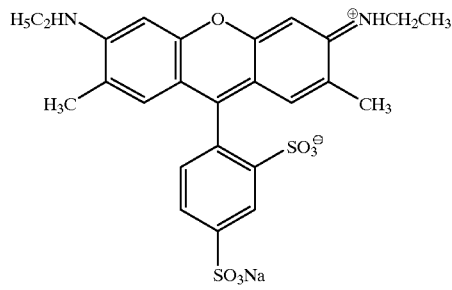
C.I. Acid Red 51 (R2-D)
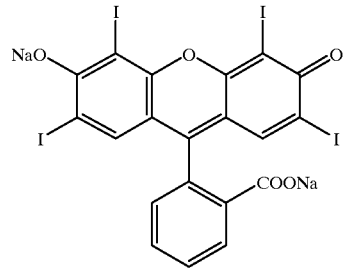
C.I. Acid Red 87 (R2-E)
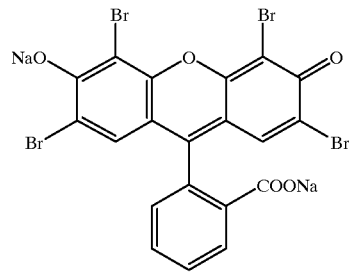
C.I. Acid Red 91 (R2-F)
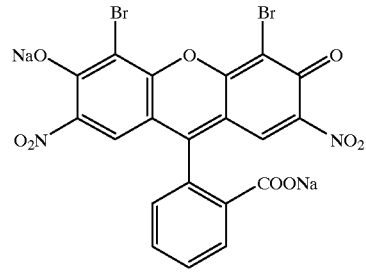
C.I. Acid Red 92 (R2-G)
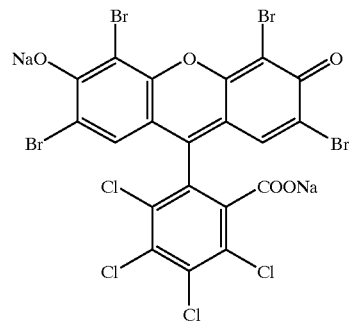
C.I. Acid Red 93 (R2-H)
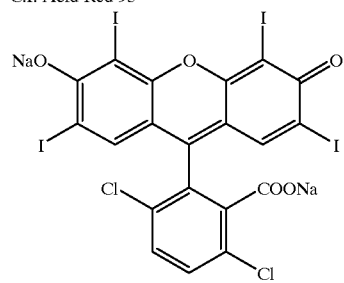
C.I. Acid Red 94 (R2-I)
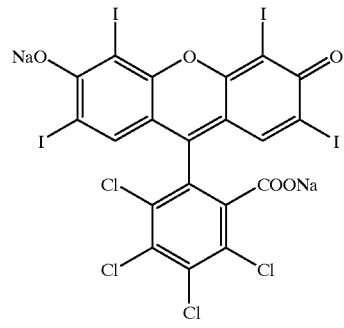
C.I. Acid Red 95 (R2-J)
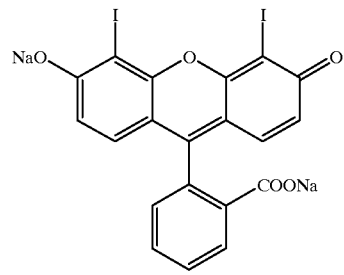

-continued (R2-K)

C.I. Acid Red 98

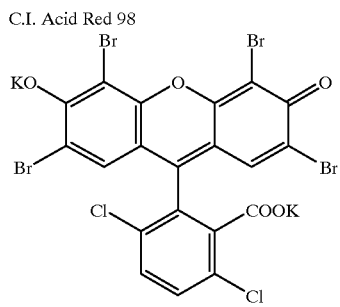

(R2-L)

C.I. Acid Violet 9

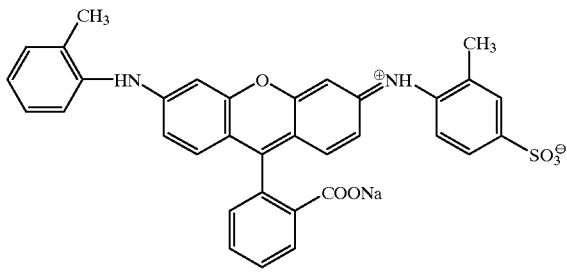

(R2-M)

C.I. Acid Violet 30

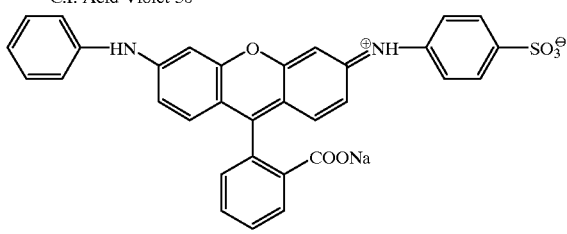

In addition, C.I. Acid Red 306 or C.I. Acid Violet 102 is exemplified.

Here, one coloring metter selected from metal-containing azopyrazolone dyes indicated by the above formulas (R1-1) and (R1-2) singly may form a red pixel. Alternatively, a mixture of at least two coloring matters selected from these coloring matters or a mixture of at least one coloring matter selected from these coloring matters and a conventionally known pigment are employed, thereby to form such red pixel. In particular, a combination of at least one pigment selected from the metal-containing azopyrazolone dyes indicated by the above formulas (R1-1) and (R1-2) and at least one dye selected from the dyes having xanthene backbones indicated by the above formula (R2) is preferred because the combination meets properties required for the color filter described in the following (a) to (d) at a high level, and ink jet ejection stability required for the ink when these pigments are introduced into an ink to manufacture a color filter using an ink jet recording method described later is never degraded.

a) high transparency of the colored section (pixel) of the color filter
b) restriction of variation with an elapsed time in an area of the colored section (pixel) of the color filter (hereinafter, referred to as "blurring")
c) high adhesion of the colored section (pixel) of the color filter
d) high light resistance of the colored section (pixel) of the color filter The red colored pixel containing the above dyes can be produced by adjusting an ink including the above dyes so that the ink is capable of being ejected using an ink jet head, and applying the ink ejected from the ink jet head to a desired area (hereinafter, referred to as "an ink jet process"). A combination of the metal-containing azopyrazolone dye and a dye having a xanthene backbone, which is particularly preferable to form a red pixel by the ink jet process, includes a combination of the metal-containing azopyrazolone dye wherein at least one of $R_1$ and $R_2$ is $SO_3$ (M1) in the above general formula (R1-1) and both of $R_3$ and $R_4$ are a $SO_3$ (M1) group; and sulforhodamines (the above mentioned C.I. Acid Red 289, C.I. Acid Red 52, C.I. Acid Red 50 or the like) indicated by the above general formula (R2-2), Z2 being a sulfonic group ($-SO_3^-$).

It is preferred that a weight ratio between the metal-containing azopyrazolone dye and a dye having a xanthene backbone in an ink is 50:1 to 1:2, particularly 20:1 to 1:1, and further 10:1 to 2:1 because a red pixel with superior optical characteristics is obtained.

As to the total amount of the metal-containing azopyrazolone dye and the dye having xanthene backbone based on the total weight of an ink, the range of 0.1 to 15 wt %, in particular, 1 to 10 wt %, and further, 2 to 8 wt % is preferred. In this range, the satisfactory optical characteristics can be provided to the pixel, and the ink properties are free of being so varied as to deviate from the range in which it is possible to eject an ink precisely by the ink jet recording method.

The above mentioned coloring material is held in a dissolved or dispersed state or a dissolved and dispersed state, and an aqueous medium or the like including water can be employed as a medium constituting an ink. A ratio of water as a constituent component of the aqueous medium is preferred to be 10 to 90 wt %, and in particular, 20 to 80 wt % based on the total weight of ink.

In addition, an aqueous organic solvent may be contained in the aqueous medium. For example, by using the following water-soluble organic solvent, solubility of the ink constituent component can be improved, and adjustment of viscosity or the like can be performed. In particular, a water-soluble solvent with the boiling point of about 150 to 250° C. is preferably employed because when the ink is ejected by ink jet recording method and the ink is deposited to a substrate, the solvent reduces the possibility of orifice clogging, and is free of reducing the adhesion with the substrate. Such kinds of water-soluble organic solvents are shown in table 2, for example.

TABLE 2-1

| Solvent | Boiling point (° C.) |
| --- | --- |
| N,N-dimethylformamide | 153 |
| 1-metylcyclohexanol | 155 |
| 3-heptanol | 156.2 |
| 2-ethoxyethyl acetate | 156.3 |
| 1-hexanol | 157.1 |
| 2-heptanol | 160.4 |
| Cyclohexanol | 161 |
| 2-furaldehyde | 161.8 |
| N,N-dimethylethanolamine | 162.1 |
| 2-methylcyclohexanol | 165 |
| Abiethinol | 165 |
| N,N-dimethylacetamide | 166.1 |
| 2-(methoxy methoxy)ethanol | 167.5 |
| Diacetone alcohol | 168.1 |
| Furfuryl alcohol | 170 |
| Ethylene glycol monobutyl ether | 170.2 |
| Monoethenolamine | 171 |
| 3-methylcyclohexanol | 173 |

TABLE 2-1-continued

| Solvent | Boiling point (° C.) |
| --- | --- |
| 4-methylcyclohexanol | 173 |
| 1-heptanol | 176.3 |
| N,N-ethylformamide | 177 |
| Tetrahydrofuryl alcohol | 178 |
| 2-octanol | 178 |
| N-methylformamide | 180 |
| Ethylene glycol monoisoamyl ether | 181 |
| 2,3-butanediol | 182 |
| Ethylene glycol monoacetate | 182 |
| Glycerol monoacetate | 182 |
| 2-ethyl-1-hexanol | 184.7 |
| 1,2-propanediol | 187.3 |
| Dipropylene glycol monomethyl ether | 190 |
| Ethylene glycol diacetate | 190.2 |
| 1,2-butanediol | 190.5 |

TABLE 2-2

| Solvent | Boiling point (° C.) |
| --- | --- |
| Ethylene glycol monobutyl ether acetate | 191.5 |
| 3,5,5-trimethyl-1-hexanol | 194 |
| Diethylene glycol monomethyl ether | 194.1 |
| 1-octanol | 195 |
| 2-methyl-2,4-pentanediol | 197.1 |
| Dipropylene glycol monoethyl ether | 197.8 |
| Ethylene glycol | 197.9 |
| N-methylpyrrolidone | 202 |
| Diethylene glycol monoethyl ether | 202 |
| γ-butyrolactone | 204 |
| Benzyl alcohol | 205.5 |
| N-methyl acetamide | 206 |
| 1,3-butanediol | 207.5 |
| Ethylene glycol monohexyl ether | 208.1 |
| Formamide | 210.5 |
| 1,3-propanediol | 214 |
| 1-nonanol | 214 |
| Diethylene glycol monoethyl ether acetate | 214.7 |
| α-terpineol | 219 |
| Acetamide | 221.2 |
| 1,4-butanediol | 229.2 |
| Diethylene glycol monobutyl ether | 230.4 |
| 1-decanol | 231 |
| Dipropylene glycol | 231.8 |
| 2-buthene-1,4-diol | 235 |
| Ethylene carbonate | 238 |
| Propylene carbonate | 242 |
| 1,5-pentandiol | 242.4 |
| 1-undecanol | 243 |
| Tripropylene glycol monomethyl ether | 243 |
| 2-ethyl-1,3-hexandiol | 243.2 |
| Ethylene glycol monophenyl ether | 244.7 |
| Diethylene glycol | 244.8 |
| 2-pyrrolidone | 245 |
| Diethylene glycol monobutyl ether acetate | 246.8 |
| Triethylene glycol monomethyl ether | 249 |

In addition, a nonionic, anionic, or cationic surface active agent may be employed for an ink, and further, an additive such as pH adjuster or mildew proof agent may be added as required.

An ink of such kind is very preferably employed to form a red color pixel by ejecting the ink from a recording head by means of a bubble jet type using a thermoelectric converting element as an energy generating element or a piezo jet type using a piezoelectric element, and applying it onto a substrate of the color filter. The ink ejection characteristics becomes particularly superior by setting the surface tension to 30 to 68 dyn/cm, the viscosity to 15 cP or less, in particular to 10 cP or less, and further, to 5 cP or less when the ink temperature is 25° C. at the time of the ink preparation. In embodiments of the present invention, as a specific ink composition capable of achieving such properties, inks described in Examples described later can be exemplified.

(2) Green Color Pixel

Phthalocyanine dye indicated by the following structural formula (G1)

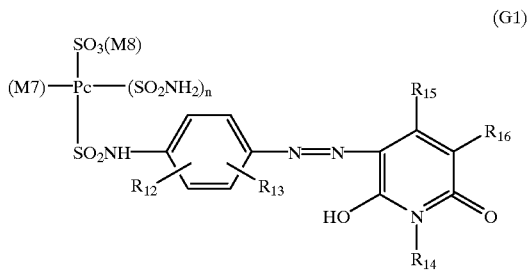

In the above formula (G1), Pc denotes a phthalocyanine backbone. (M7) indicates Cu, Zn, or Ni, and M8 indicates a monovalent alkaline metal such as Na, K, and Li or $NH_4^+$. $R_{12}$ and $R_{13}$ each indicate a hydrogen atom, $SO_3$ (M5), an unsubstituted or substituted amide group (for example, $—NHCOCH_3$, $—NHCOC_2H_5$, $—NHCOC_3H_7$ or the like), or a linear or branched alkyl group of 1 to 5 carbons, for example. M5 indicates a monovalent alkaline metal such as Na, K, and Li and $NH_4^+$. $R_{14}$ and $R_{15}$ each indicate a linear or branched alkyl group with 1 to 5 carbons, for example. $R_{16}$ indicates $—CONHR_{17}$, $—COOH$, or $—COO$ (M6), and M6 indicates a monovalent alkaline metal such as Na, K, and Li or $NH_4^+$. In addition, R17 indicates a hydrogen atom or a linear or branched alkyl group with 1 to 4 carbons. n indicates 0, 1, or 2.

A specific example of the above formula (G1) includes a phthalocyanine dye indicated by the following structural formula G1-A.

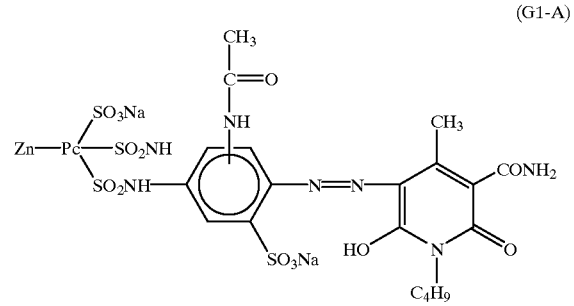

(Zn—Pc Indicates a Zinc Phthalocyanine Backbone.)

Phthalocyanine dye indicated by the following structural formula (G2)

In the formula, Met denotes a divalent to tetravalent metal ion or two hydrogen atoms; RPc denotes a phthalocyanine residue into which 1 to 8 phenyl groups are introduced; M9 denotes a hydrogen atom, an alkaline metal, or an ammonium ion; x denotes 1 to 8; y denotes 0 to 7 (provided that x+y<8); and when Met denotes a trivalent or tetravalent metal ion, one or two ligands exist, respectively.

The divalent to tetravalent metal ion that can be 'Met' of the formula (G2) includes Cu, Zn, Fe, Co, Ni, Mn, Cr, Mg, Al, Si, Sn, Ti, Ge, Ga, Pb or the like.

The alkaline metal that is M9 of the formula (G2) includes Li, Na, K, Rb, Cs, Fr or the like.

The phthalocyanine compound indicated by the formula (G2) can be obtained through a process for "sulfoxylizing" the phthalocyanine compound indicated by MetRPc, for example. For this "sulfoxylizing", a fuming sulfuric acid or chlorosulfonic acid can be preferably employed. Their amount may be 8 times as much as the phthalocyanine compound at a molar ratio, and preferably, may be reacted under a very excessive atmosphere. A solvent inert to reaction may be employed for this reaction; however, it is preferable to use fuming sulfuric acid or chlorosulfonic acid serving also as a solvent without using another solvent, thereby helping dissolving the phthalocyanine compound with low solubility.

An optimal reaction temperature can be selected depending on the type of phthalocyanine compound employed as a raw material, and in particular, depending on the metal type. Reaction can be carried out at a temperature selected from the range of 0 to 80° C. at which decomposition of the phthalocyanine compound itself does not occur, and predetermined reaction can be advanced. In general, such reaction is preferably carried out at a temperature ranging from 15 to 50° C. The reaction time differs depending on raw materials to be employed, reaction temperature, reaction concentration or the like. In general, the time can be selected from the range of 2 to 24 hours.

Basic substances to be employed for a post-treatment after the reaction of the fuming sulfuric acid and chlorosulfonic acid include alkaline metal compounds such as sodium hydroxide and pottasium hydroxide, amines such as ammonia, triethyl amine, N,N-dimethyl aniline, pyridine, pyperidine, DBU or the like. These substances may be employed singly or two or more of them may be properly employed in combination. The reaction system can be added by dissolving these basic substances intact or dissolving them in a proper solvent.

Combinations of Met and M9 in the phthalocyanine compound of the formula (G2) is shown in table 3.

TABLE 3

| Compound | |
|---|---|
| G2-A | CuPc (Ph)$_8$ $\diagup$(SO$_3$Na)$x$ $\diagdown$(SO$_2$NH$_2$)$y$ (Note 1) |
| G2-B | CuPc (Ph)$_8$ $\diagup$(SO$_3$K)$x$ $\diagdown$(SO$_2$NH$_2$)$y$ (Note 1) |
| G2-C | CuPc (Ph)$_4$ $\diagup$(SO$_3$Na)$x$ $\diagdown$(SO$_2$NH$_2$)$y$ (Note 2) |

TABLE 3-continued

| Compound | |
|---|---|
| G2-D | ZnPc (Ph)$_8$ $\diagup$(SO$_3$Na)$x$ $\diagdown$(SO$_2$NH$_2$)$y$ (Note 1) |
| G2-E | ZnPc (Ph)$_8$ $\diagup$(SO$_3$K)$x$ $\diagdown$(SO$_2$NH$_2$)$y$ (Note 1) |
| G2-F | ZnPc (Ph)$_4$ $\diagup$(SO$_3$Na)$x$ $\diagdown$(SO$_2$NH$_2$)$y$ (Note 2) |

(Note 1):
$x$ denotes 1 to 8, $y$ denotes 0 to 7, and $x + y \leq 8$
(Note 2):
$x$ denotes 1 to 4, $y$ denotes 0 to 3, and $x + y \leq 4$.

Naphthalocyanine dye indicated by the following structural formula (G3)

(G3)

In the above formula (G3), Met denotes a divalent to tetravalent metal ion or two hydrogen atoms, NPc denotes a naphthalocyanine residue, M10 denotes a hydrogen atom, an alkaline metal, or an ammonium ion, x denotes 1 to 4, y denotes 0 to 3 (provided that x+y≦4), and when Met denotes a trivalent or tetravalent metal ion, one or two ligands exist, respectively.

Divalent to tetravalent metal ions that can be Met of the formula (G3) include Cu, Zn, Fe, Co, Ni, Mn, Cr, Mg, Al, Si, Sn, Ti, Ge, Ga, Pb or the like.

Alkaline metals as M10 of the formula (G3) include Li, Na, K, Rb, Cs, Fr or the like.

The naphthalocyanine compound indicated by the formula (G3) can be obtained through a process for "sulfoxylizing" the phthalocyanine compound indicated by MetNPc, for example. For this "sulfoxylizing", a fuming sulfuric acid or chlorosulfonic acid can be preferably employed. Their amount may be 4 times as much as the phthalocyanine compound at a molar ratio, and may be preferably reacted under a very excessive atmosphere. A solvent inert to reaction may be employed for this reaction. However, it is preferable to use fuming sulfuric acid or chlorosulfonic acid serving also as a solvent without using another solvent, thereby helping dissolving the phthalocyanine compound with low solubility.

An optimal reaction temperature can be selected depending on the type of phthalocyanine compound employed as a raw material, and in particular, depending on the metal type. For example, reaction can be carried out at a temperature selected from the range of 0 to 80° C. at which decomposition of the phthalocyanine compound itself does not occur, and predetermined reaction can be advanced. In general, this reaction is preferably carried out at a temperature ranging from 15 to 50° C. The reaction time differs depending on raw material to be employed, reaction time, reaction concentration or the like. In general, the time can be selected from the range of 2 to 24 hours.

The basic substances to be employed for the post-treatment after the reaction of the fuming sulfurisc acid and chlorosulfonic acid include alkaline metal compounds such as a sodium hydroxide, a potassium hydroxide or the like, and amines such as ammonia, triethyleneamine, N, N-dimethylaniline, pyridine, pyperidine, DBU or the like. These substances may be used singly or two or more of them may be employed as required. In the reaction system, these basic substances can be added without treatment or after dissolving in a proper solvent.

Table 4 shows a typical example of the phthalocyanine compound of the formula (G3).

TABLE 4

| | Compound |
|---|---|
| G3-A | CuNPc(SO$_3$Na)$x$(SO$_2$NH$_2$)$y$ (Note 1) |
| G3-B | CuNPc(SO$_3$K)$x$(SO$_2$NH$_2$)$y$ (Note 1) |
| G3-C | CuNPc(SO$_3$Li)$x$(SO$_2$NH$_2$)$y$ (Note 1) |
| G3-D | ZnNPc(SO$_3$Na)$x$(SO$_2$NH$_2$)$y$ (Note 1) |
| G3-E | ZnNPc(SO$_3$K)$x$(SO$_2$NH$_2$)$y$ (Note 1) |
| G3-F | ZnNPc(SO$_3$Li)$x$(SO$_2$NH$_2$)$y$ (Note 1) |

(Note 1):
$x$ denotes 1 to 4, $y$ denotes 0 to 3, and $x + y \leq 4$.

Pyrazolone dye indicated by the following structural formula (G4)

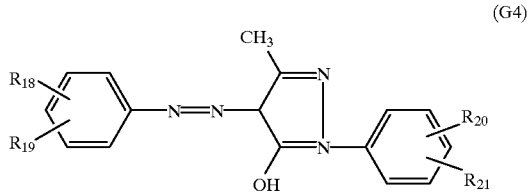

(G4)

In the above formula (G4), $R_{18}$ and $R_{19}$ each indicate a hydrogen atom, a OH group, a halogen atom, a linear or branched alkyl group with 1 to 5 carbons, a nitro group, a $CF_3$ group, or $SO_3$ (M11) group. At least one of $R_{18}$ and $R_{19}$ is particularly preferable to be a nitro group or a $CF_3$ group when the properties of the green colored pixel are taken into consideration. In addition, M11 is preferable to be a monovalent alkaline metal such as Na, K, and Li or $NH_4$.

Both of $R_{20}$ and $R_{21}$ are preferable to be $SO_3$ (M12). That is, when both of $R_{20}$ and $R_{21}$ are a sulfonic group, the solubility of this pyrazolone dye in the ink is improved more, and the ink ejection stability can be improved more. In addition, M12 is preferable to be a monovalent alkaline metal such as Na, K, and Li or $NH_4$.

In consideration of the properties of the foregoing (a) to (d) and the ink ejection stability when the ink jet process are adopted, a pyrazolone dye in which $R_{18}$ is a $CF_3$ group, and $R_{19}$ is a hydrogen atom in the above general formula (G4), is preferable. M12 in SO3 (M12) constituting $R_{20}$ and $R_{21}$ of the above general formula (G4) is preferred to be Na, for example.

A specific example of the pyrazolone dye indicated by the formula (G4) is shown in table 5 below.

TABLE 5

| | $R_{18}$ | $R_{19}$ | $R_{20}$ | $R_{21}$ |
|---|---|---|---|---|
| G4-A | $CF_3$ | H | $SO_3Na$ | $SO_3Na$ |
| B | $CF_3$ | $CF_3$ | $SO_3Na$ | $SO_3Na$ |
| C | $NO_2$ | H | $SO_3Na$ | $SO_3Na$ |
| D | $NO_2$ | $NO_2$ | $SO_3Na$ | $SO_3Na$ |
| E | Cl | H | $SO_3Na$ | $SO_3Na$ |
| F | Cl | Cl | $SO_3Na$ | $SO_3Na$ |
| G | OH | H | $SO_3Na$ | $SO_3Na$ |
| H | $SO_3Na$ | H | $SO_3Na$ | $SO_3Na$ |
| I | $CF_3$ | H | $SO_3Na$ | H |
| J | $NO_2$ | H | $SO_3Na$ | H |
| K | Cl | H | $SO_3Na$ | H |
| L | Cl | Cl | $SO_3Na$ | H |
| M | $SO_3Na$ | H | $SO_3Na$ | H |
| N | C.I. Acid Yellow 73 | | | |

Here, the coloring matters indicated by the above formulas (G1), (G2), (G3), and (G4) may form a green color pixel singly. Alternatively, a mixture of at least two coloring matters selected from these coloring matters or a mixture of at least one coloring matter selected from these coloring matters and a conventionally known coloring matter are employed, thereby to form such green color pixel. In particular, a combination of at least one coloring matter selected from the phthalocyanine dyes indicated by the above formula (G1) and at least one dye selected from the pyrazolone dyes indicated by the above formula (G4) can provide a color filter with its superior characteristics of the foregoing (a) to (d). In addition, when these coloring matters are introduced into an ink for manufacturing the color filter using an ink jet recording method, the ink jet ejection stability of the ink is good.

Here, when a mixture of the pyrazolone dye of the above formula (G4) and the phthalocyanine dye of the formula (G1) is used, it is preferable that the weight ratio is about 1:4 to 4:1 in consideration of the ink ejection properties and color filter characteristics.

It is preferable that the total amount of the dyes in the ink is in the range of 0.1 to 15 wt %, particularly 1 to 10 wt %, and further, 2 to 8 wt % based on the total weight of the ink. In these ranges, the satisfactory optical characteristics can be provided to the pixel, and the ink properties are free of deviating from the range of the characteristics capable of precisely ejecting the ink by the ink jet recording method.

The above mentioned coloring material is held in a dissolved or dispersed state or a dissolved and dispersed state, and an aqueous medium or the like containing water, for example, can be employed as a medium constituting the ink. The ratio of water as a constituent component of the aqueous medium is preferably 10 to 90 wt %, and in particular, 20 to 80 wt % based on the total weight of the ink.

In addition, a water-soluble organic solvent may be contained in the aqueous medium. For example, by using the following water-soluble organic solvent, the solubility of the ink constituent component is improved, and the adjustment of viscosity can be carried out. In particular, the water-soluble organic solvent with a boiling point of about 150 to 250° C. is preferably employed because the solvent reduces the possibility of orifice clogging, and is free of reducing the adhesion with the substrate when the ink is ejected using the ink jet recording method, and is applied to the substrate. Such water-soluble organic solvents include the solvents shown in table 2, for example.

(3) Blue Color Pixel

Porphyradine dye indicated by the following structural formula (B1)

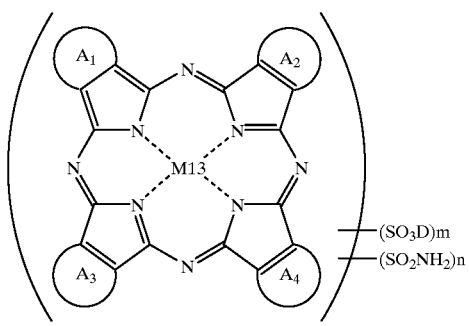

(B1)

m denotes an integer from 1 to 4, n denotes an integer from 0 to 3, and m+n denotes an integer from 1 to 4.

In the formula, $A_1$ to $A_4$ each independently denote an aromatic ring that may be substituted by a halogen atom, a nitro group, an alkyl group, an aryl group, an alkoxy group, a sulfonic group, or a sulfoamide group; or a nitrogen-containing heteroaromatic ring. In addition, at least one of $A_1$ to $A_4$ denotes a nitrogen-containing complex ring. M13 denotes two hydrogen atoms or a divalent metal, or a trivalent or tetravalent metal derivative, and D denotes a monovalent alkaline metal such as Na, K, and Li or $NH_4$.

The aromatic ring or nitrogen-containing heteroaromatic ring capable of constituting $A_1$ to $A_4$ in the formula (B1) can be those having a structure shown in the following formulas (1) to (7). However, all of $A_1$ to $A_4$ do not have a structure shown in the formula (7) simultaneously.

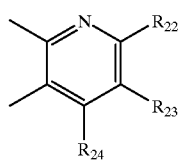

(1)

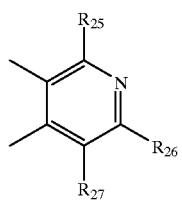

(2)

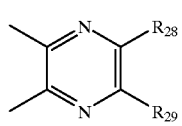

(3)

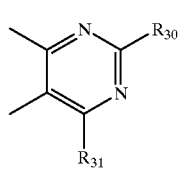

(4)

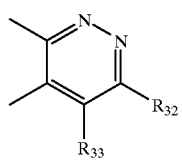

(5)

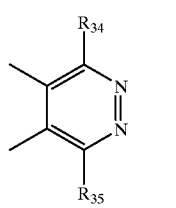

(6)

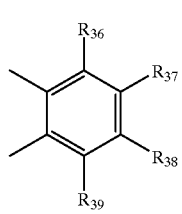

(7)

In the above (1) to (6), $R_{22}$ to $R_{35}$ each independenly denote a hydrogen atom, a sulfonic group, or a sulfoamide group. In the above formula (7), $R_{36}$ to $R_{39}$ each independently denote a hydrogen atom, a halogen atom (for example, a fluorine atom, a chlorine atom, a bromine atom, an iodine atom or the like), and a group selected from a nitro group, an alkyl group with 1 to 6 carbons that may be substituted by a linear or branched alkyl group with 1 to 3 carbons, an aryl group that may be substituted by a linear or branched alkyl group with 1 to 3 carbons, a linear or branched alkoxy group with 1 to 6 carbons (for example, a methoxy group, an ethoxy group, an n-propoxy group, an n-butoxy group or the like), a sulfonic group, and a sulfonic amide.

The divalent metal as M13 includes Cu, Zn, Fe, Co, Ni, Ru, Pb, Rh, Pd, Pt, Mn, Sn, and Pb. The trivalent or tetravalent metal derivative as M13 includes AlCl, InCl, FeCl, MnOH, SiCl, SnCl$_2$, GeCl$_2$, Si(OH)$_2$, Sn(OH)$_2$, Ge(OH)$_2$, VO, and TiO. In particular, Cu, Ni, Co, Fe, Cl, Zn, VO, Pd, and MnOH are preferred.

As typical examples of the porphyradine derivative represented by the formula (B1), the following compounds (B1-A) to (B1-K) can be exemplified.

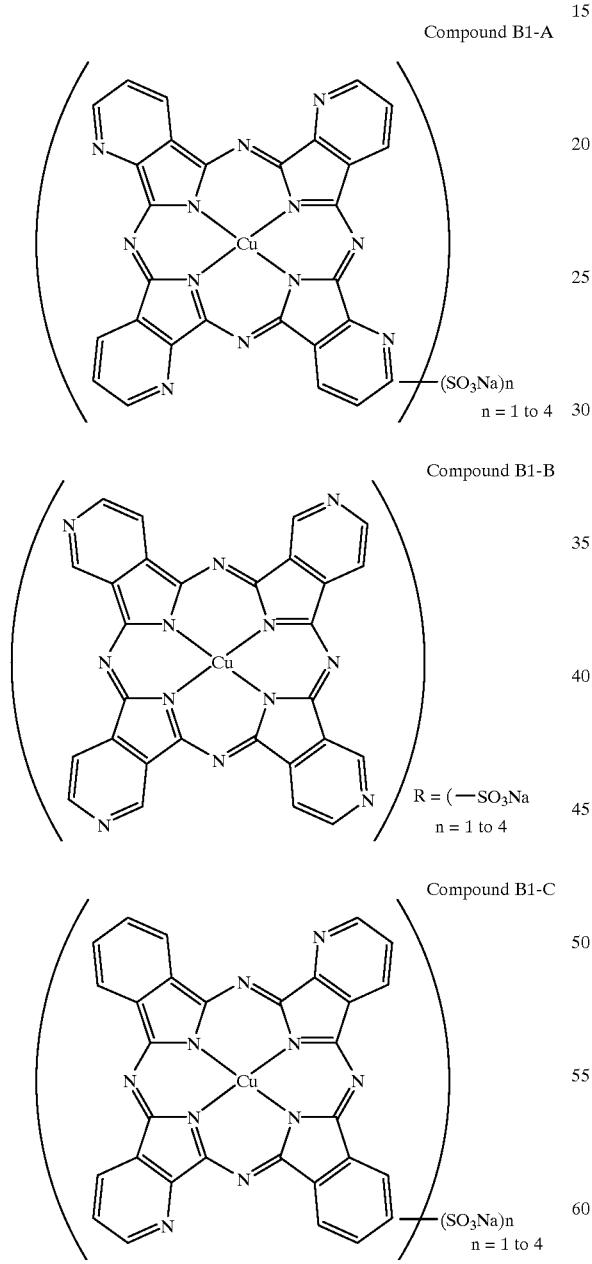

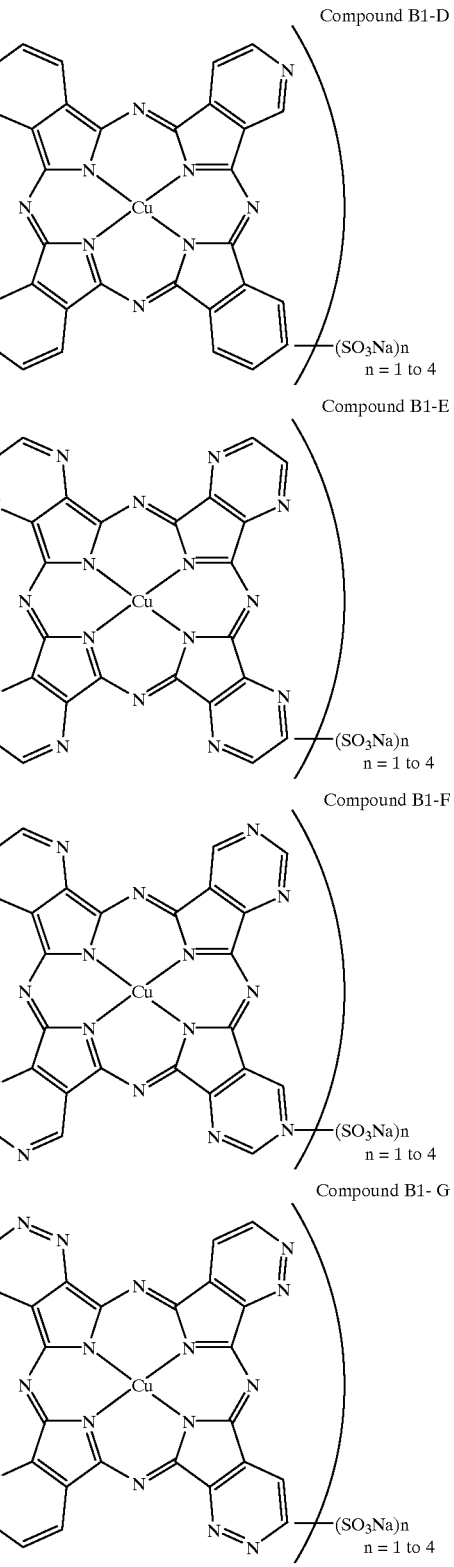

-continued

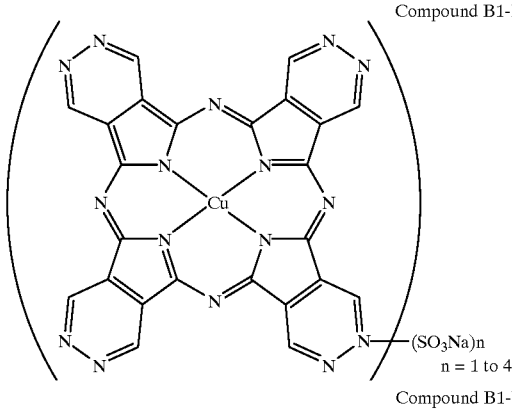

Compound B1-H

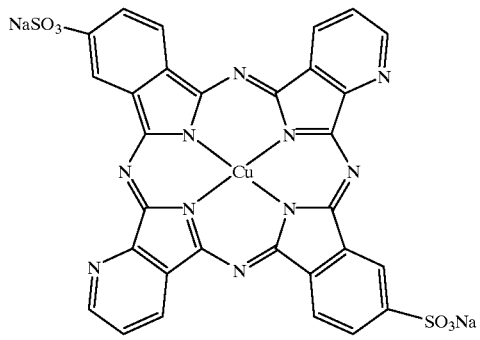

Compound B1-J

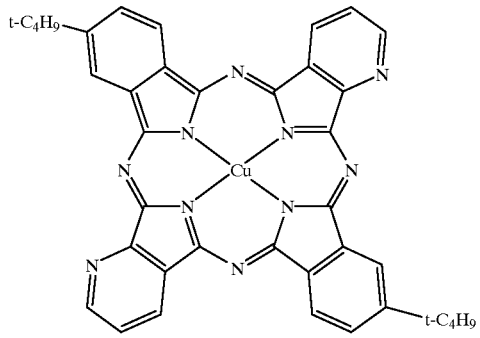

Compound B1-K

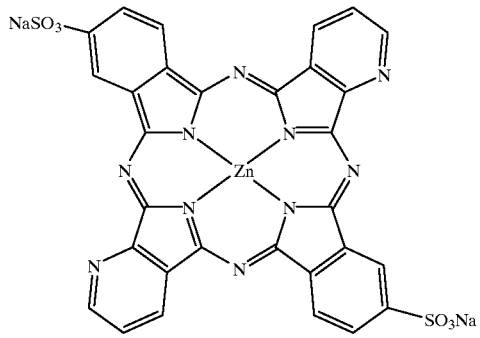

Compound B1-Y

The porphyradine derivative of the formula (B1) can be produced by reacting the nitrogen-containing aromatic dicyano compound expressed by the following formula (8) with a metal derivative such as a cuprous chloride, for example.

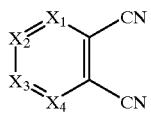

(8)

[$x_1$ to $x_4$ each denote a carbon atom or a nitrogen atom that may be substituted independently, and at least two of these atoms have been substituted, and are carbon atoms.]

Alternatively, this derivative can also be obtained by reacting the nitrogen-containing aromatic dicarboxylic acid derivative indicated by the following formula (9) with a metal derivative such as cuprous chloride and urea.

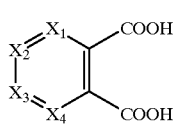

(9)

[$x_1$ to $x_4$ each denote a carbon atom or a nitrogen atom that may be substituted independently. At least two of these atoms have been substituted, and are carbon atoms.]

Further, in a method for generally synthesizing a phthalocyanine derivative such as phthalimide having a nitrogen-containing aromatic ring, an intermediate having a nitrogen-containing aromatic ring is employed, thereby making it possible to synthesize a target porphyradine derivative as required.

The amount of the metal derivative and the intermediate having a nitrogen-containing aromatic ring in synthesizing of the porphyradine derivative according to the present invention, preferably ranges from 1:3 to 1:6 at a mole ratio. Further, different types of nitrogen-containing aromatic intermediates are mixed with each other, and the resultant mixture is reacted with a metal derivative, thereby making it possible to synthesize a porphyradine derivative containing several kinds of aromatic rings in the same molecule simultaneously. At this time, a phthalic anhydride, for example, in which nitrogen is not contained in the aromatic ring may be mixed for the synthesis. However, it is carried out so that at least one aromatic ring having a nitrogen atom is included.

As an example, when 2,3-pyridine carboxylic acid is reacted with a phthalic acid at a mole ratio of 1:1, the following compound L that is an intermediate having a structure analogous to phthalocyanine can be synthesized, and a sulfonic acid group amide is introduced as required, thereby a porphyradine derivative of the present invention can be obtained.

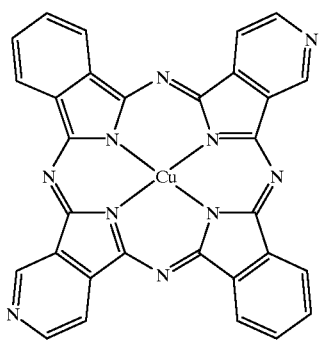

Compound L

It is preferable that synthetic reaction is carried out under the existence of a proper solvent. As a solvent at this time, an organic solvent with a boiling point of 130° C. or more is preferably employed. For example, the solvent includes trichlorobenzene, nitrobenzene, quinoline, chloronaphthalene, n-amyl alcohol, n-hexanol, cyclohexanol, 2-methyl-1-pentanol, 1-heptanol, 2-heptanol, 1-octanol, 2-ethylhexanol, benzyl alcohol, ethylene glycol, propylene glycol, ethoxy ethanol, propoxy ethanol, butoxy ethanol, dimethylaminoethanol, diethylaminoethanol, sulfolan or the like, without being limitative thereto. The quantity of the solvent used for synthesis is 1 to 100 times in weight or is preferably 5 to 20 times in weight of the nitrogen-containing aromatic ring dicarboxylic acid derivative or a nitrogen-containing aromatic ring dicyano compound that is an intermediate.

Center metals previously exemplified in the formula (B-1) can be employed, and in synthesizing, a metal derivative employed so that a desired metal or metal derivative is positioned at a center is selected.

Further, in synthetic reaction, 1,3-diazabicyclo [5.4.0]-7-undecene (DBU) or ammonium molybdate may be added. The additive quantity is 0.1 to 10 times in mole or is preferably 0.5 to 2 times in mole per one mole of phthalonitryl compound.

The reaction temperature is 80 to 300° C., and is preferably 130 to 230° C. If the temperature is less than 80° C., the reaction may be extremely slow. If the temperature exceeds 300° C., decomposition of porphyradine derivative may occur. The reaction time can be set to 2 to 20 hours, and preferably to 5 to 15 hours. If the reaction time is less than 2 hours, large amount of unreacted raw materials exist. If the reaction time exceeds 20 hours, decomposition of the porphyradine derivative may occur.

The porphyradine derivative according to the present invention is characterized by having a sulfonic group in order to obtain good solubility for a pigment used in an ink for an ink jet process. When the sulfonic group is introduced into a molecule, a nitrogen-containing aromatic dicarboxylic acid derivative or a nitrogen-containing aromatic dicyano compound may be used as an intermediate. Alternatively, after an intermediate having a phthalocyanine analogous structure in a state that does not have a sulfonic group, as described above, is synthesized, the sulfonic group may be introduced. The sulfonic group is introduced into the intermediate having a phthalocyanine analogous structure by heating this intermediate in the chlorosulfonic acid of 1 to 20 times in weight, and preferably, 5 to 10 times in weight, for example. The reaction temperature at this time can be set to 90 to 150° C., and preferably to 120 to 140° C., and the reaction time can be set to 1 to 12 hours, and preferably to 4 to 6 hours. Whether or not the sulfonic group is added can be verified by refining the target porphyradine derivative following the completion of additive reaction of the sulfonic group, analyzing it by FT-IR, and observing sharp absorption peaks at 1290 cm$^{-1}$ and 1120 cm$^{-1}$.

Further, the sulfonic group in the porphyradine derivative according to the present invention may be partially converted into amide to enhance affinity with an ink receiving layer or improve water resistance when the ink receiving layer is employed for a substrate in the manufacture of the color filter. The method for introducing an amide includes the following: making a sulfochloride of the porphyradine derivative obtained by heating an intermediate having a phthalocyanine analogous structure in a chlorosulfonic acid react with ammonia in the sulfonizing process; and employing a chloride agent such as a thionyl chloride for a porphyradine derivative already having a sulfonic group, thereby to produce a sulfochloride, and then making it react with ammonia, thereby to produce an amide. The sulfochloride of the porphyradine derivative is easily hydrolyzed; and therefore, high yield can be obtained when it is gradually reacted at a temperature of ice.

As a blue coloring matter employed in the present invention, a coloring matter consisting of a phthalocyanine derivative may be used in combination with a coloring matter consisting of the above porphyradine derivative. This phthalocyanine derivative is represented by the following formula (B-2), for example.

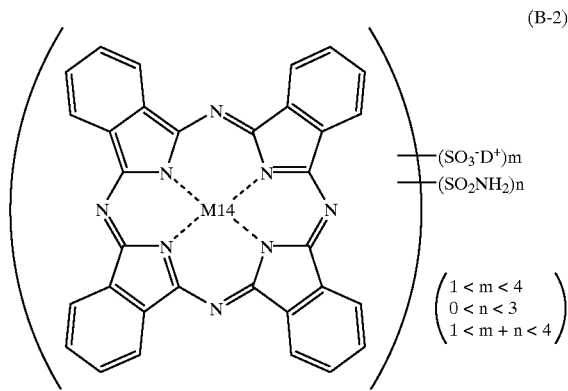

(B-2)

[In the formula, m denotes the number of sulfonic groups; n denotes the number of sulfonamide groups; D denotes an alkaline metal or ammonia; and M14 denotes a divalent metal having two hydrogen atoms or a substituent, or a trivalent or tetravalent metal derivative.]

An alkaline metal D includes a monovalent alkaline metal, for example. In addition, a divalent metal M14 includes copper, zinc, iron, cobalt, nickel, ruthenium, lead, rhodium, paradium, platinum, tin or the like. A trivalent or tetravalent metal derivative includes AlCl, InCl, FeCl, MnOH, SiCl, SnCl$_2$, GeCl$_2$, Si(OH)$_2$, Sn(OH)$_2$, Ge (OH)$_2$, VO, TiO or the like.

A specific example of the pigments consisting of this phthalocyanine derivative, includes C.I. Direct Blue 86, 97, 199 or the like.

(Ink for Ink Jet Recording)

An ink for ink jet recording according to one Example of the present invention includes a porphyradine derivative having the above mentioned nitrogen-containing aromatic ring as a coloring matter constituting an ink coloring material; and a phthalocyanine derivative as required. This ink can be preferably employed as an ink for forming a blue pigment of a color filter.

The weight ratio between the porphyradine and phthalocyanine derivatives in the ink can be selected from the range of 10:0 to 1:9 when these coloring matters are combined with each other. In particular, the ratio of 3:7 to 7:3 is preferable because the ink can be preferably employed as an ink for forming a blue color pixel of the color filter.

It is preferable that the total amount of the pigments in the ink is in a range of 0.1 to 1.0 weight %, is particularly 1 to 10 weight %, and further 2 to 8 weight % based on the total weight of the ink. In this range, satisfactory optical characteristics are provided to a pixel, and the ink properties are free of being so varied as to deviate from the range in which the ink can be ejected precisely by the ink jet recording method.

The above coloring matters are held in a dissolved or dispersed state or a dissolved and dispersed state. As a medium constituting an ink, an aqueous medium or the like containing water can be employed. The ratio of water as a constituent component of the aqueous medium is preferably 10 to 90 weight %, and is particularly preferable to be 20 to 80 weight % based on the total weight of the ink.

A water-soluble organic solvent may be contained in the aqueous medium. For example, by using the following water-soluble organic solvent, the solubility of the ink constituent components can be improved, and adjustment of viscosity or the like can be carried out. In particular, the water-soluble organic solvent with a boiling point of about 150 to 250° C. is preferably employed because the solvent reduces the possibility of orifice clogging, and is free of reducing adhesion with a substrate when the ink is ejected using the ink jet recording method, and is applied to the substrate. Further, the content of the water-soluble organic solvent is 5 to 50 weight % for an organic solvent with a boiling point of 150 to 250° C.; and more preferably 5 to 50 weight % for an organic solvent with a boiling point of 180 to 230° C. In addition, an organic solvent with a boiling point of 250° C. or more is more preferable to be 30 weight % or less; and an organic solvent with a boiling point of 230° C. or more is further preferable to be 20 weight % or less. As usable solvents, those listed in table 2 can be exemplified.

In addition, a nonionic, anionic, or cationic surface active agent may be employed for an ink, and further, additives such as a PH adjuster, a mildew proof agent or the like may be added as required.

An ink of such kind is very preferably employed to form a blue color pixel by ejecting the ink from a recording head by means of an ink jet system, for example, bubble jet type using a thermoelectric converting element as an energy generating element or by piezo jet type or the like using a piezoelectric element, and applying the ink on a substrate of the color filter. The ink ejection properties becomes particularly superior by setting the surface tension to 30 to 68 dyn/cm, the viscosity to 15 cP or less, particularly to 10 cP or less, and further to 5 cP or less when the ink temperature is 25° C. at the time of ink preparation. In embodiments of the present invention, as a specific ink composition capable of achieving such properties, for example, the inks described in Examples described later can be exemplified.

(Method for Manufacturing a Color Filter)

Next, a method for manufacturing a color filter in which color elements are formed by a variety of the above mentioned coloring matters by using an ink jet process will be described. FIG. 2A to FIG. 2E are illustrative views of a liquid crystal color filter according to one embodiment of the present invention.

Figure 2A:
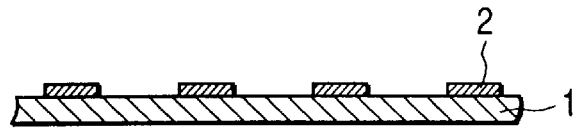
FIG. 2A, FIG. 2B, FIG. 2C, FIG. 2D, and FIG. 2E are flow charts of a method for manufacturing a color filter according to one embodiment of the present invention.

FIG. 2A shows a light-transmissible substrate 1 (for example, a glass substrate or the like) on which a light shield section 2 (hereinafter, referred to as "a black matrix") is formed in a pattern shape. A method for forming the black matrix 2 includes that comprising the stps of forming a thin film of a metal (for example, chrome, chromic oxide or the like) by spattering or evaporation and thereafter conducting patterning with a photolithography process, when the matrix is directly provided on the substrate. In addition, when the matrix is provided on a resin composition, a patterning method with a general photolithography process is exemplified.

Figure 2B:

First, a layer containing a resin composition that can be cured is formed on the substrate 1 on which the black matrix 2 has been formed, and then an ink receiving layer 3 is formed on the substrate 1 (FIG. 2B). As a substrate, a glass is generally employed. When a liquid crystal color filter can satisfy its generally required characteristics such as light transparency, mechanical strength or the like, a crystal acrylic resin substrate or the like can be employed without being limited to the glass.

A publicly known material can be used for forming the ink receiving layer 3. In consideration of heat resistance or the like, for example, an acrylic resin, an epoxy resin, or an imide-based resin is preferred. Further, in consideration of aqueous-ink absorptivity, those including cellulose-based water-soluble polymers such as hydroxypropyl cellulose, hydroxyethyl cellulose, methyl cellulose, carboxymethyl cellulose are preferred. Furthermore, polyvinyl pyrrolidone, polyvinyl alcohol, polyvinyl acetal, polyurethane, carboxymethyl cellulose, polyester or the like, or natural resins such as albumin, gelatin, casein, starch, cationic starch, gum arabic, alginic acid soda or the like can be exemplified. In particular, in addition to heat resistance and ink absorptivity, in consideration of transparency and blurring of the aforementioned colored section and light resistance of dyes or the like, a mixture of hydroxypropyl cellulose and methylolmelanin or a compound including at least a single monomer consisting of the following structural unit (10) and/or a copolymer with another vinyl based monomer is preferably employed.

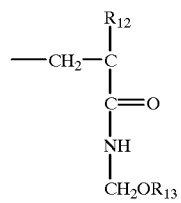

(10)

In the above general formula, $R_{12}$ denotes H or $CH_3$ and the like, and $R_{13}$ denotes H or an unsubstituted alkyl group or an alkyl group that may be substituted by a linear or branched alkyl group or the like with 1 to 5 carbons. The monomer equivalent to a structural unit represented by the above formula (10) includes, for example, N-methylolacrylamide, N-methoxymethylacrylamide, N-ethoxymethylacrylamide, N-isopropoxymethylacrylamide, N-methylolmethacrylamide, N-methoxymethylmethacrylamide, N-ethoxymethylmethacrylamide or the like. The other vinyl based monomer includes acrylic acid, methacrylic acid, acrylic ester (methyl acrylate, ethyl acrylate or the like), methacrylic ester (methyl methacrylate, ethyl methacrylate or the like), a vinyl monomer containing a hydroxyl group (hydroxymethyl methacrylate, hydroxyethyl methacrylate, hydroxymethyl acrylate, hydroxyethyl methacrylate, hydroxymethyl acrylate, hydroxyethyl acrylate or the like), styrene, a-methyl styrene, acrylamide, methacrylamide, acrylonitryl, allylamine, vinylamine, vinyl acetate, vinyl propionate or the like. A rate of copolymerization between a monomer equivalent to the structural unit of the above general formula (10) and another vinyl monomer is preferably in the range of 95:5 to 5:95 at a molar ratio.

In addition, a variety of additives may be contained in the above receiving layer 3 as required. A specific example of the additives includes a variety of surface active agents, dye fixing agents (water proofing agents), bubble extinguishing agents, anti-oxidization agents, fluorescent whitening agents, ultraviolet-ray absorbers, viscosity adjusters, pH adjusters, mildew proofing agents, plasticizers or the like. These additives may be arbitrarily selected according to their purposes from the conventional publicly known compounds.

A method for forming the ink receiving layer 3 includes spin coating, roll coating, bar coating, spray coating, dip coating or the like. In addition, a pre-baking may be carried out as required.

Figure 3:
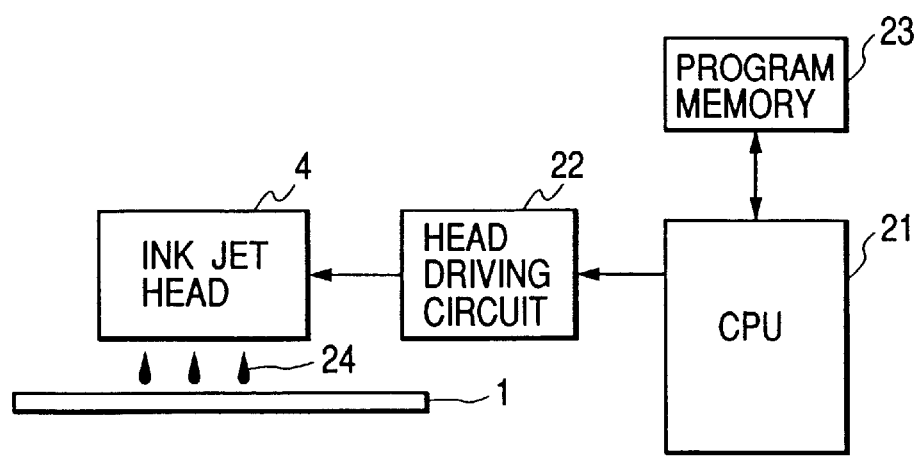
FIG. 3 is a schematic illustration of a method for forming pixels of a color filter using an ink jet process.
Figure 2C:
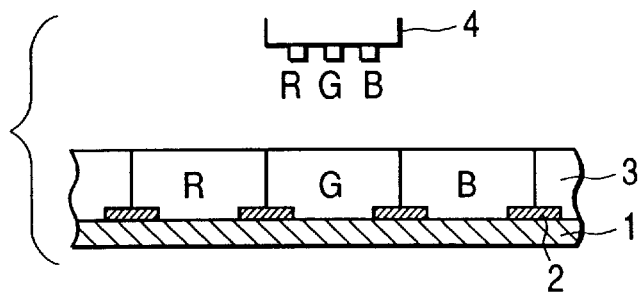

Then, the above mentioned ink according to the present invention is applied to an image forming site of the ink receiving layer 3 by an ink jet system, thereby coloring a predetermined site of the ink receiving layer 3 (FIG. 2C). As an ink jet system, a bubble jet type using an thermoelectric converting element as an energy generating element or a piezo jet type using an piezoelectric element is available, and a coloring area and a coloring pattern can be arbitrarily set. Here, a preferred method for ejecting an ink with an ink jet process, thereby to form a pixel will be described with reference to FIG. 3. FIG. 3 is a block diagram depicting a construction of the apparatus for drawing a coloring site of the color filter with the ink jet process. In FIG. 3, CPU 21 is connected to an ink jet recording head 4 via a head driving circuit 22. Further, CPU 21 is constructed so that the control program information in a program memory 23 is inputted. Furthermore, CPU 21 moves the ink jet recording head 23 to a predetermined position of a substrate 1 (not shown), brings a desired position on the substrate 1 downward of the ink jet head, and ejects an ink 24 of a desired color to that position, thereby perform coloring. This process is carried out for a desired pixel position on the substrate 1, thereby a color filter can be manufactured.

Figure 2D:
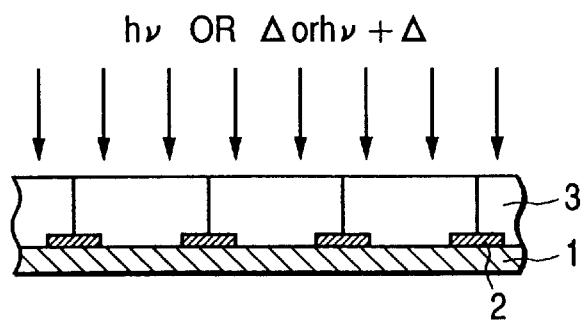

Next, the ink receiving layer 3 is cured (FIG. 2D). The curing method suitable to a curable resin used for the ink receiving layer may be used. For example, heating, light irradiation, or heating and light irradiation is conducted to cure the layer, thereby to form the colored pixel 11 of each color. Here, the light to be irradiated to the ink absorption layer is not particularly limited; and however, in particular, the Deep-UV light is preferable, and the light irradiation condition of 1 to 3000 mJ/cm$^2$ is preferred. In addition, heat treatment using a means such as oven and hot plate or the like is exemplified. The heat treatment may be carried out for 10 seconds to 20 minutes under temperature conditions of 50° C. to 180° C.

Figure 2E:
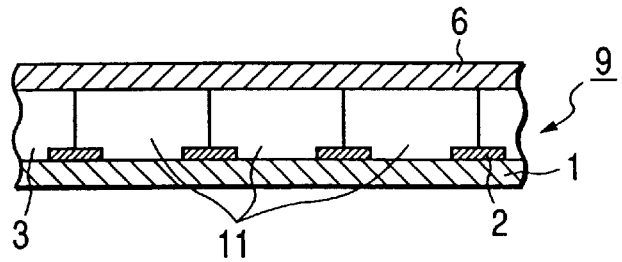

Thereafter, a protective layer 6 is formed on the cured ink receiving layer 3 as required (FIG. 2E). The protective layer 6 can be provided by coating a resin material curable by light irradiation or heat treatment, for example, and then curing the material; or forming an inorganic film through evaporation or spattering. A preferable material usable for the protective layer is free of losing transparency required for a color filter when the protective layer is formed, and is endurable against ITP-form process, oriented film forming process or the like to be carried out as required after the layer has been formed. Specifically, the organic material includes an acrylic resin such as epoxy acrylate, an urethane acrylate or the like; and the inorganic material includes $SiO_2$ or the like. In this manner, the color filter 9 according to this embodiment can be obtained.

Second Embodiment

Next, a second embodiment of the color filter according to the present invention will be described. This embodiment is different from the first embodiment in that a site corresponding to the black matrix 2 of the ink receiving layer 3 is cured, and ink absorptibity is lowered prior to applying an ink to the ink receiving layer 3. The manufacturing process will be described with reference to FIG. 4A to FIG. 4F. First, the substrate 1 having the black matrix formed on its surface, prepared in a manner similar to that described in the first embodiment, is provided to form the ink receiving layer 3 so as to cover the black matrix 2 (FIG. 4A and FIG. 4B). Here, a material which lowers the ink absorptibity of the ink receiving layer 3 through light irradiation is preferably employed for the ink receiving layer 3.

In this embodiment, as a material constituting the ink receiving layer 3, a light polymerization initiator further contained in the constituent material of the ink receiving layer 3 employed in the aforementioned first embodiment is preferably employed. An example of the light polymerization initiator preferably used therein includes, for example, an onium salt or halide triazine compound. Specifically, the onium salt include triphenylsulfoniumhexafluoroantimonate, triphenylsulfoniumtetrafluorobolate, triphenylsulfoniumhexafluorophosphate, triphenylsulfoniumtrifluoromethylsulfonate or these derivatives, and further, diphenyliodoniumhexafluoroantimonate, diphenyliodoniumtetrafluorobolate, diphenyliodoniumhexafluorophosphate, diphenyliodoniumtrifluoromethylfurfonate or these derivatives. Among them, halide triazine compounds are preferably employed. Further, the derivatives or the like of these compounds are exemplified. The amount of the above mentioned polymerization initiator to be added is 0.01 to 20% by weight or is preferably 0.1 to 10% by weight to the above mentioned ink receiving material. In addition a compound such as perylene, anthracene or the like may be added as a sensitizer.

Then, a site corresponding to the black matrix of the ink receiving layer 3 is selectively exposed by using a photo mask 41 or the like, for example, and the site corresponding to the black matrix 2 of the ink receiving layer 3 is cured (FIG. 4C). As a result, a site (non-coloring site) 42 with low ink absorptibity is selectively formed on the ink receiving layer 3. There should be used a photo mask employed for pattern exposure, for example, the mask comprising an opening 43 that can be selectively exposed to an ink receiving layer site corresponding to the black matrix 2. Here, a width (Y) of the opening 43 is preferably narrower than a width (X) of the black matrix 2. That is, when the color filter is formed in this manner, it is not preferable that a color skip occurs at the boundary site of each pixel and the black matrix 2. To prevent this problem, it is preferable to eject much more ink to an area in which each pixel of the ink receiving layer is to be formed. In view of this point, a width of the non-coloring site of the ink receiving layer 3 is preferably narrower than the width (X) of the black matrix 2. Such non-coloring site can be formed by employing the photo mask 42 in which the width (Y) of the above mentioned opening 43 is narrower than the width (X) of the black matrix 2. The light irradiated to the ink absorption layer when the non-coloring site 43 is formed is not particularly limited. As described previously, the Deep-UL light and the light irradiation condition of 1 to 3000 mJ/cm$^2$ are preferably used. Heat treatment is carried out by means of oven, hot plate or the like, for example. Such heat treatment may be carried out under a temperature condition of 50° C. to 180° C. for 10 seconds to 20 minutes.

In the subsequent process (FIG. 4D to FIG. 4F), as described in FIG. 2C to FIG. 2E, an ink is applied to a position at which each pixel is to be formed using the ink jet process, and the ink receiving layer 3 is cured, thereby the color filter can be manufactured.

According to this embodiment, there can be prevented a trouble due to color mixing, color non-uniformity or the like between pixels, in particular, between adjacent pixels or the like, which is likely to occur when each of the R, G, B pixels is formed using the ink jet process, and the color filter with low cost and high quality image can be manufactured.

In this embodiment, a resin on the black matrix is cured so that an ink is not applied between pixels. However, a water repellence agent or the like which lowers ink adhesion may be applied onto the black matrix so that the ink is not applied on the surface of the black matrix, thereby to provide non-coloring properties.

Third Embodiment

Next, a manufacturing process of the color filter according to a third embodiment of the present invention, characterized in that the color filter is manufactured without providing the ink receiving layer 3, will be described with reference to FIG. 5A to FIG. 5D.

Figure 5A:
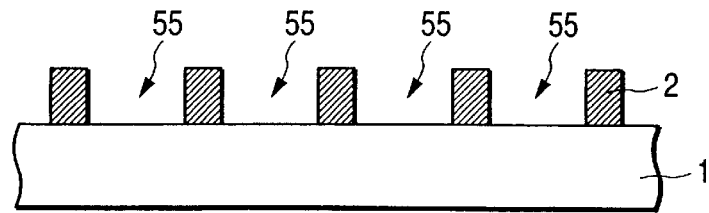
FIG. 5A, FIG. 5B, FIG. 5C, and FIG. 5D are flow charts of a method for manufacturing a color filter according to still another embodiment of the present invention.

First, a substrate having a black matrix 2 formed on its surface is provided in a manner similar to that described in the first embodiment (FIG. 5A). In this embodiment, a predetermined thickness, for example, a wall of 0.5 micrometer or more is preferably formed between pixels. For that purpose, a black resin resist is preferably patterned, thereby to form the black matrix 2.

Figure 5B:
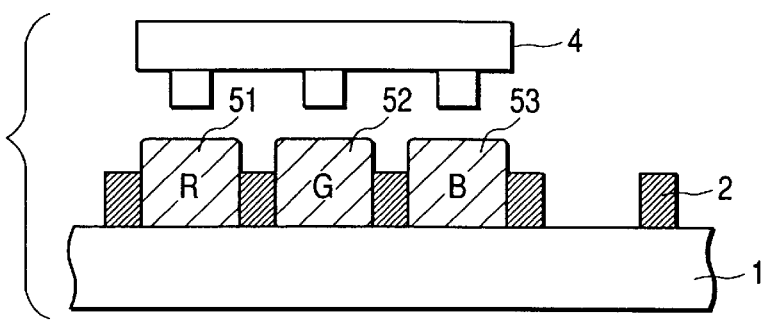

Next, as shown in FIG. 5B, an R ink 51, a G ink 52, and a B ink 53 are applied so as to compensate for a light transmission section 55 between black matrixes 2 using the ink jet system. At this time, these inks are preferably applied so that each color ink does not overlay on the black matrix 2.

(Ink Composition)

As an R ink giving a red pixel used in this embodiment, for example, there can be employed an ink including at least one pigment selected from metal-containing azopyrazolone dyes indicated by the above formulas (R1-1) and (R1-2) and dyes each having a xanthene backbone indicated by the formulas (R2-1) and (R2-2). In addition, as a G ink giving a green pixel, for example, there can be employed an ink including at least one coloring matter selected from dyes each having a structure indicated by the formulas (G1), (G2), (G3), and (G4). Further, as a B ink giving a blue pixel, there can be employed an ink including at least one coloring matter selected from dyes each having a structure indicated by the formula (B1) or an ink including at least one coloring matter selected from dyes each having a structure indicated by the formula (B1) and at least one coloring matter selected from dyes each having a structure indicated by the formula (B2). Here, at least one ink selected from the R, G, and B inks, or preferably all the inks in which a resin curable by applying light and/or heat energy is contained, can be preferably employed. In addition, the G and B inks containing the resin therein are preferably employed.

(Description of Curable Resin Components in the Ink and Content Thereof)

Here, as the above mentioned resin, a variety of commercially available resins and curing agents can be employed, which preferably cause a problem such as fixation in the ink or the like. Such material includes an acrylic resin, an epoxy resin, a melanine resin or the like. In addition, a volume of a light curable component contained in the ink, a thermally curable component, or a component curable by light and heat is preferably about 0.1 to 20%, for example, based on the total weight of the ink.

Figure 5C:
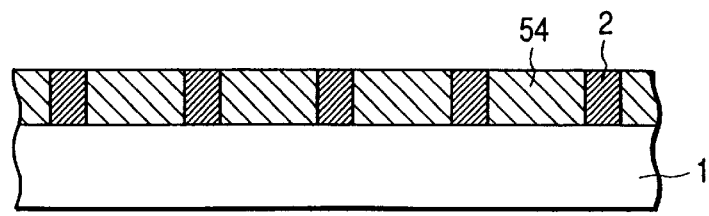
Figure 5D:
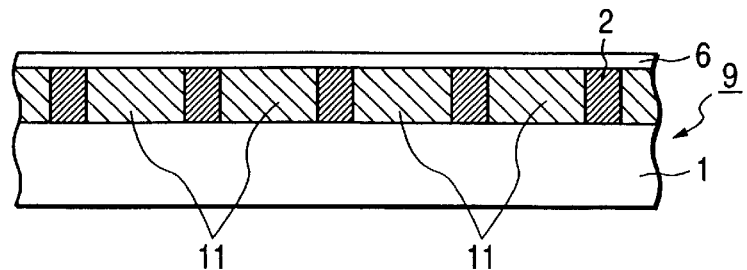

Next, as shown in FIG. 5C, light irradiation, heating or both of the light irradiation and heating is carried out, thereby to partially cure an ink applied to the opening 55 on the substrate 1. Then, as shown in FIG. 5D, a curable resin composition is applied so as to cover a colored site 54 formed by the black matrix 2 and each color ink, the colored site 54 is completely cured by light irradiation and/or heat treatment, thereby to complete a colored pixel 11, and a curable resin composition is cured to form a protective layer 6 and obtained a color filter. The protective film 6 may be formed by curing a curable resin material through light irradiation and/or heat treatment or an inorganic film is formed by evaporation or spattering to be a protective layer 6. In addition, there can be preferably used a material available for forming the protective film 6, having transparency when the color filter is formed, the material endurable to a subsequent ITP-form process, a process for forming an oriented film.

A variety of methods for manufacturing a color filter using the ink jet process have been described. A method for manufacturing a color filter according to the present invention is not particularly limited, and for example, a dyeing process, a pigment dispersing process, an electrolytic deposition process and the like are exemplified.

In the dyeing process, a water-soluble polymeric material which is a dyeing material is applied onto a glass substrate, this material is patterned in a desired shape by a photolithography process, and the thus obtained pattern is immersed in a dyeing bath and is colored therein. This process is repeated three times, thereby to form R (red), G (green), and B (blue) colored layers.

In recent years, the pigment dispersing process is substituted by the dyeing process. In this process, a photosensitive resin layer having a pigment dispersed on a substrate is formed, and a monochrome pattern is obtained by pattering this layer. Further, this process is repeated three times, thereby to form the R, G, and B colored layers.

In the electrolytic deposition process, a transparent electrode is patterned on a substrate, and the electrode is immersed into an electrolytic deposition coating liquid containing a pigment, a resin, a dielectric or the like to electrically deposit a first color. This process is repeated three times, thereby to form the R, G, and B colored layers, and finally it is baked.

Otherwise, a pigment is dispersed in a thermally curable resin, and printing is repeated three times thereby to coat R, G, and B. Thereafter, a resin is thermally cured, thereby to form the colored layers. In any process, a protective film is generally formed on a color filter layer.

(Liquid Crystal Display Panel)

Figure 6:
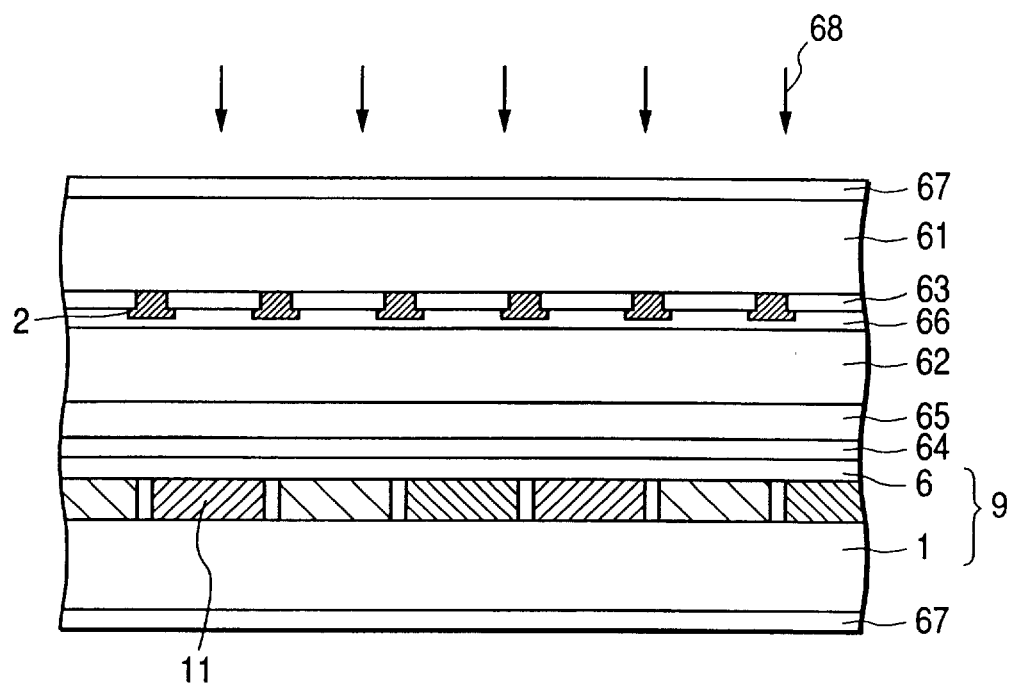
FIG. 6 is a schematic sectional view of a liquid crystal display panel according to one embodiment of the present invention.
Figure 7:
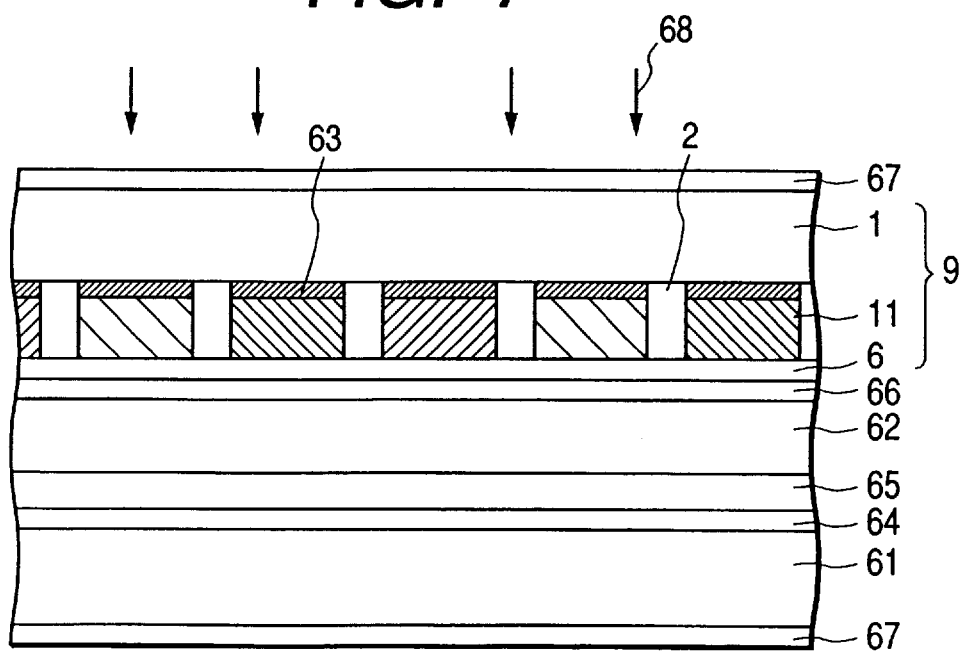
FIG. 7 is a schematic sectional view of a liquid crystal display panel according to another embodiment of the present invention.

A sectional view of a TFT color liquid crystal display panel incorporating a color filter according to the present invention is as shown in FIG. 1. Another construction of the liquid crystal display panel includes a black matrix (BM) on-array type (type of which BM is formed on the opposite TFT substrate side as shown in FIG. 6), a color filter (CF) on-array type (type of which a CF section is formed on the TFT substrate side as shown in FIG. 7) or the like.

Figure 8:
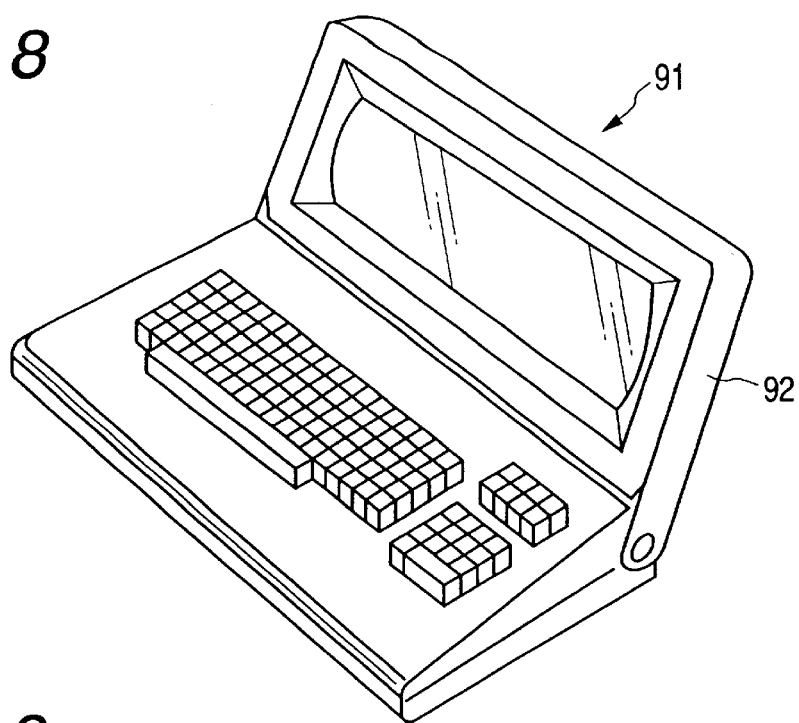
FIG. 8 is a schematic perspective view of a computer according to one embodiment of the present invention.
Figure 9:
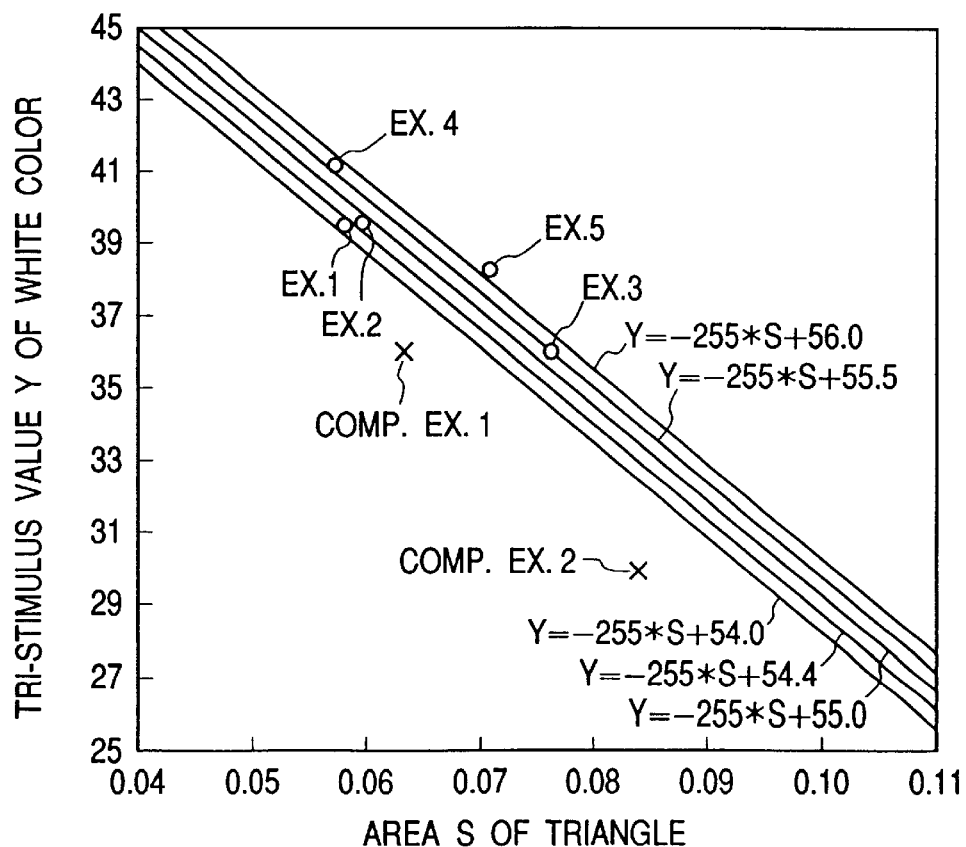
FIG. 9 is a graph showing the relationship between tri-stimulus value of white color and area S of a triangle of the color filters prepared in the working Examples.

The thus prepared liquid crystal display panel is employed as an image display device 92 such as a computer 91, as shown in FIG. 8, for example.

As has been described above, according to the present invention, there can be provided a color filter with high color density and superior transparency. As a result, a proper tone representation in an area close to black is obtained without increasing back light luminance, for example. In addition, a computer comprising a high quality image display section can be obtained by employing a liquid crystal display panel for high quality image display, and by employing that liquid crystal display panel for the image display section.

EXAMPLES

Next, embodiments of the present invention each will be specifically described with reference to Examples.

Example 1

A photosensitive resin composition comprising of an acrylic copolymer composed of the following compositions was applied by spinner on a surface of a polished no-alkali glass, the composition was baked at 90° C. for 20 minutes, thereby to form a photosensitive resin layer of 1 $\mu$m in film thickness.

(Photosensitive resin composition)

Methymethacrylte,

Hydroxyethylmethacrylate,

Three-dimensional copolymer of N-methylolacrylamide: 10 parts by weight (Monomer composition ratio: 2:3:5)

Triphenylsulfoniumhexafluoroantimolate: 0.3 part by weight

Ethylcellosolve: 89.7 parts by weight

A pattern exposure was done via a photo mask so that an area other than that in which a color filter is to be formed is exposed, and a photosensitive resin layer was partially cured. At the uncured portion of the photosensitive resin layer, each of the R, G, and B inks adjusted in the composition shown in table 6 below was ejected by the ink jet system (a driving voltage: 27 volts (V) and a pulse width (7 $\mu$sec), the ink to be ejected eight times per pixel was applied to the photosensitive resin layer, the resin layer was baked at 90° C. for 20 minutes and at 200° C. for 60 minutes, and each colored section was formed.

TABLE 6

| R ink | | G ink | | B ink | |
|---|---|---|---|---|---|
| Metal-containing azopyrazolone dye (R1-1)I | 3 parts by weight | Phthalo-cyanine dye G2-A | 3.5 parts by weight | Porfiradine dye B1-E | 2 parts by weight |
| Metal-containing azopyrazolone dye R2-G | 1 | Pyrazolone dye G4-J | 4 | C.I. Direct Blue 87 | 3 |
| C.I. Acid Red 315 | 0.5 | Ethylene glycol | 30 | Ethylene glycol | 30 |
| Ethylene glycol | 30 | Water | 62.5 | Water | 65 |
| Water | 65.5 | | | | |

The thus obtained color filter showed 0.05844 in an area (S) for a triangle formed by connecting the xy chromaticity coordinate (standard C light source) of each of the R, G, and B pixels, and the stimulus value (Y) of the white color synthesized at this time was 39.3. That is, the condition of Y$\geq$−255*S+54 was met.

Next, this color filter was used to fabricate a liquid crystal display device, and a color pattern was displayed using a back light source of 2500 cd/m$^2$ in luminance at a color temperature of about 7000 K under an observational environment of 500 lux in illuminance. As a result, the color pattern was identified even at a gradation boundary, and a good quality image was obtained.

Example 2

A color filter was fabricated in a manner similar to that in Example 1 except the use of the R, G, and B inks each shown in table 7 below.

TABLE 7

| R ink | | G ink | | B ink | |
|---|---|---|---|---|---|
| Metal-containing azopyrazolone dye (R1-1)I | 2 parts by weight | Phthalo-cyanine dye G2-D | 4.3 parts by weight | Porfiradine dye B1-E | 2.5 parts by weight |
| Xanthene based dye R2-G | 0.7 | Pyrazolone dye G4-G | 5.5 | C.I. Direct Blue 87 | 2.6 |
| C.I. Acid Red 315 | 1 | Ethylene glycol | 30 | Ethylene glycol | 30 |
| Ethylene glycol | 30 | Water | 60.2 | Water | 64.9 |
| Water | 66.3 | | | | |

The thus obtained color filter showed 0.06016 in an area (S) for a triangle formed by connecting the xy chromaticity coordinate (standard C light source) of each of the R, G, and B pixels, and the stimulus value (Y) of the white color synthesized at this time was 39.5. That is, the condition of Y$\geq$−255*S+54.5 was met.

Next, a liquid crystal display device was fabricated using this color filter, and a color pattern was displayed using a back light source with 2500 cd/m$^2$ in luminance at a color temperature of about 7000 K under an observational condition of 500 lux in illuminance. As a result, the color pattern was identified even at a gradation boundary, and a superior quality image was obtained.

Example 3

A color filter was fabricated in a manner similar to that in Example 1 except the use of the R, G, and B inks each shown in table 8 below.

TABLE 8

| R ink | | G ink | | B ink | |
|---|---|---|---|---|---|
| Metal-containing azopyrazolone dye (R1-1)F | 3.5 parts by weight | Phthalo-cyanine dye G1-A | 5.1 parts by weight | Porfiradine dye B1-G | 2.6 parts by weight |
| Xanthene based dye R2-A | 0.9 | Pyrazolone dye G4-E | 2.9 | C.I. Direct Blue 199 | 3.4 |
| Ethylene glycol | 30 | Ethylene glycol | 30 | Ethylene glycol | 30 |
| Water | 65.6 | Water | 62 | Water | 64 |

The thus obtained color filter showed 0.07667 in an area (S) of a triangle formed by connecting the xy chromaticity coordinate (standard C light source) of each of the R, G, and B pixels, and a stimulus value (Y) of a white color was 35.9. That is, the condition of Y$\geq$−255*S+55 was met.

Next, a liquid crystal display device was fabricated using this color filter, and a color pattern was displayed using a back light of 2500 cd/m² in luminance at a color temperature of about 7000 K under an observational environment of 500 lux in illuminance. As a result, the color pattern was identified even at a gradation boundary, and a very good quality image was obtained.

Example 4

A color filter was fabricated in a manner similar to that in Example 1 except the use of the R, G, and B inks each shown in table 9 below.

TABLE 9

| R ink | | G ink | | B ink | |
|---|---|---|---|---|---|
| Metal-containing azopyrazolone dye (R1-1)B | 2.5 parts by weight | Phthalocyanine dye G1-A | 4 parts by weight | Porfiradine dye B1-C | 1.8 parts by weight |
| Xanthene based dye R2-A | 0.5 | Pyrazolone dye G4-A | 2 | C.I. Direct Blue 199 | 2.2 |
| Ethylene glycol | 30 | Ethylene glycol | 30 | Ethylene glycol | 30 |
| Water | 67 | Water | 64 | Water | 66 |

The thus obtained color filter showed 0.05766 in an area (S) for a triangle formed by connecting the xy chromaticity coordinate (standard C light source) of each of the R, G, and B pixels, and a stimulus value (Y) of a white color synthesized at this time was 41. That is, the condition of $Y \geq -255*S+55.5$ was met.

Next, a liquid crystal display device was fabricated using this color filter, a color pattern was displayed using a back light source of 2500 cd/m² in luminance at a color temperature of about 7000 K under an observational environment of 500 lux in illuminance to. The color pattern was identified even at a gradation boundary, and a very superior image was obtained.

Example 5

A color filter was fabricated in a manner similar to that in Example 1 except the use of the R, G, and B inks each shown in table 10 below.

TABLE 10

| R ink | | G ink | | B ink | |
|---|---|---|---|---|---|
| Metal-containing azopyrazolone dye (R1-1)J | 3 parts by weight | Phthalocyanine dye G1-A | 3.8 parts by weight | Porfiradine dye B1-C | 2.2 parts by weight |
| Xanthene based dye R2-A | 0.8 | Pyrazolone dye G4-B | 1.2 | C.I. Direct Blue 199 | 2.8 |
| Ethylene glycol | 30 | Ethylene glycol | 30 | Ethylene glycol | 30 |
| Water | 66.2 | Water | 65 | Water | 65 |

The thus obtained color filter showed 0.07134 in an area (S) for a triangle formed by connecting the xy chromaticity coordinate (standard C light source) of each of the R, G, and B pixels, and a stimulus value (Y) of a white color synthesized at this time was 38.2. That is, the condition of $Y \geq -255*S+56$ was met.

Next, a liquid crystal display device was fabricated using this color filter, and a color pattern was displayed using a back light source of 2500 cd/m² in luminance at a color temperature of about 7000 K under an observational environment of 500 lux in illuminance. As a result, the color pattern was identified even at a gradation boundary, and a very superior image was obtained.

Comparative Example 1

A color filter was fabricated in a manner similar to that in the foregoing Example 1 except the use of the R, G, and B inks each shown in table 11 below.

TABLE 11

| R ink | | G ink | | B ink | |
|---|---|---|---|---|---|
| C.I. Acid Red 35 | 4 parts by weight | C.I. Acid Green 73 | 3 parts by weight | C.I. Acid Blue 80 | 4.5 parts by weight |
| Ethylene glycol | 20 | Ethylene glycol | 20 | Ethylene glycol | 20 |
| Isopropyl alcohol | 5 | Isopropyl alcohol | 5 | Isopropyl alcohol | 5 |
| Water | 71 | Water | 72 | Water | 70.5 |

The thus obtained color filter showed 0.0635 in an area (S) for a triangle formed by connecting the xy chromaticity coordinate (standard C light source) of each of the R, G, and B pixels, and a stimulus value (Y) of a white color synthesized at this time was 36. That is, the condition of $Y \geq -255*S+54$ was not met.

Next, a liquid crystal display device was fabricated using this color filter, and a color pattern was displayed using a back light source of 2500 cd/m² at a color temperature of about 7000 K under an observational environment of 500 lux in illuminance. As a result, the tone representation is hardly seen in an area close to black compared with the color pattern of Example 1, and the gradation boundary was blocked up.

Comparative Example 2

The density of each ink employed for manufacture of the color filter of Comparative Example 1 was increased by 1.3, and a color filter was fabricated using an ink in which water was reduced by the thus increased density.

The thus obtained color filter showed 0.0840 in an area (S) for a triangle formed by connecting the xy chromaticity coordinate (standard C light source) of each of the R, G, and B pixels, and a stimulus value (Y) of a white color synthesized at this time was 30. That is, the condition of $Y \geq -255*S+54$ was not met.

Next, a liquid crystal display device was fabricated using this color filter, and a color pattern was displayed using a back light source of 2500 cd/m² at a color temperature of about 7000 K under an observational environment of 500 lux in illuminance. As a result, the tone representation was hardly seen at an area close to black compared with the color pattern of Example 1, and pthe gradation boundary was blocked up.

What is claimed is:

1. A color filter comprising red, green, and blue color elements, wherein a relationship between a tristimulus value (Y) of a white color synthesized by the color elements and an area (S) for a triangle formed by connecting the xy chromaticity in a standard C light source of said color elements each obtained based on a XYZ color system with a 2° visual field (JIS Z8701) meets $Y \geq -255*S+54$.

2. The color filter as claimed in claim 1, wherein said relationship between Y and S meets $Y \geq -255*S+54.5$.

3. The color filter as claimed in claim 2, wherein said relationship between Y and S meets $Y \geq -255*S+55$.

4. The color filter as claimed in claim 3, wherein said relationship between Y and S meets Y≧−255*S+55.5.

5. The color filer as claimed in claim 4, wherein said relationship between Y and S meets Y≧−255*S+56.

6. The color filter as claimed in claim 1, wherein the color elements each include a dye.

7. The color filter as claimed in claim 1, wherein said red color element includes at least one coloring matter of structural formulae (R1-1), (R1-2), (R2-1), or (R2-2):

(R1-1)

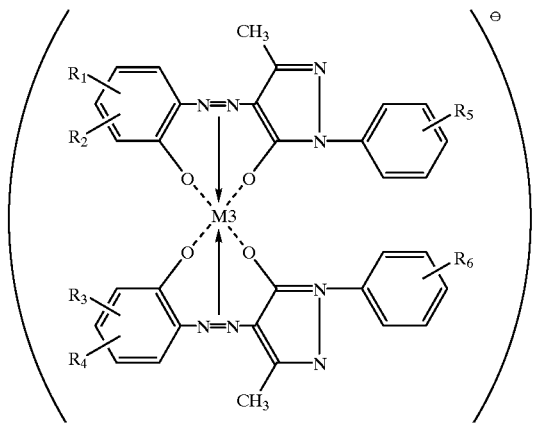

wherein $R_1$, $R_2$, $R_3$, and $R_4$ independently denote a hydrogen atom, a halogen atom, a nitro group, a $C_{1-5}$ alkyl group, $CF_3$, or $SO_3(M1)$ (where M1 indicates a monovalent alkaline metal or $NH_4^+$);

$R_5$ and $R_6$ independently denote a hydrogen atom, a halogen atom or $SO_3(M1)$;

M3 denotes Cr, Ni, or Co; and $X1^+$ denotes a monovalent alkaline metal cation or $NH_4^+$;

(R1-2)

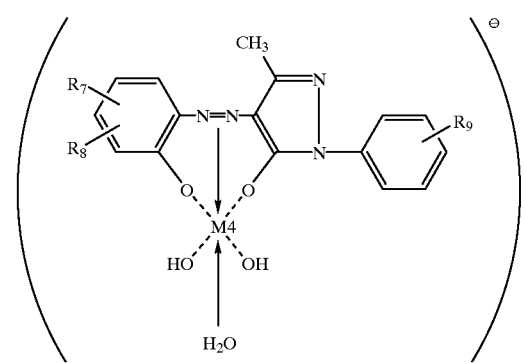

wherein $R_7$ and $R_8$ independently denote a hydrogen atom, a halogen atom, a nitro group, a $C_{1-5}$ alkyl group, $CF_3$, or a $SO_3(M1)$;

$R_9$ denotes a hydrogen atom, a halogen atom, or $SO_3(M1)$;

M4 denotes Cu or Cr; and $X2^+$ denotes a monovalent alkaline metal cation or $NH_4^+$;

(R2-1)

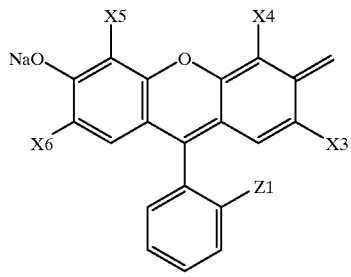

wherein $X_3$ to $X_6$ independently denote a halogen atom;

Z1 denotes —COO(M1) or —$SO_3^-$;

(R2-2)

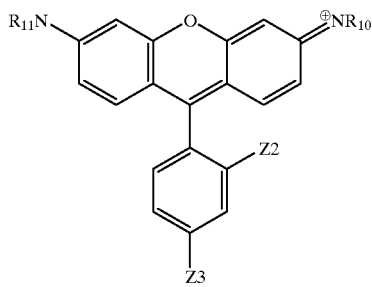

wherein $R_{10}$ and $R_{11}$ independently denote a hydrogen atom, a linear or branched $C_{1-5}$ alkyl group, or a substituted or unsubstituted aryl group; and Z2 and Z3 independently denote —COO(M1) or —$SO_3^-$;

said green color element includes at least one coloring matter of structural formulae (G1), (G2), (G3), or (G4):

(G1)

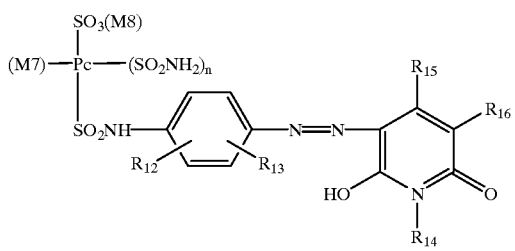

wherein Pc indicates a phthalocyanine backbone;

(M7) indicates Cu, Zn, or Ni;

$R_{12}$ and $R_{13}$ independently indicate a hydrogen atom, $SO_3(M5)$, a substituted or unsubstituted amide group, or a substituted or unsubstituted alkyl group;

$R_{14}$ and $R_{15}$ independently indicate a substituted or unsubstituted alkyl group;

$R_{16}$ indicates —$CONHR_{17}$, —COOH, or —COO(M6);

$R_{17}$ indicates a hydrogen atom or a substituted or unsubstituted alkyl group;

n indicates 0, 1, or 2; and

M5, M6, and M8 independently indicate a monovalent alkaline metal or $NH_4^+$;

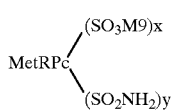

(G2)

wherein Met denotes a divalent, trivalent or tetravalent metal ion, or two hydrogen atoms;
RPc denotes a phthalocyanine residue having 1 to 8 phenyl groups;
M9 denotes a hydrogen atom, an alkaline metal, or ammonium ion; and
x denotes an integer of 1 to 8 and y denotes an integer of 0 to 7 (with the provisos that x+y<8 and when Met denotes a trivalent or tetravalent metal ion, then one or two ligands exist, respectively);

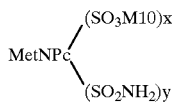

(G3)

wherein Npc denotes a naphthalocyanine residue;
M10 denotes a hydrogen atom, an alkaline metal, or an ammonium ion;
x denotes an integer of 1 to 4 and y denotes an integer of 0 to 3 (with the provisos that x+y≧4 and when Met denotes a trivalent or tetravalent metal ion, then one or two ligands exist, respectively);

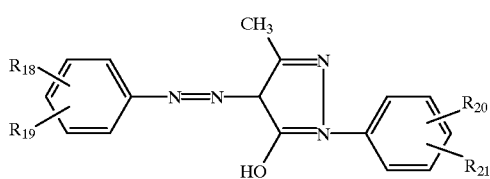

(G4)

wherein $R_{18}$ and $R_{19}$ independently indicate a hydrogen atom, a OH group, a halogen atom, a linear or branched $C_{1-5}$ alkyl group, a nitro group, $CF_3$, $SO_3(M1)$; and
$R_{20}$ and $R_{21}$ independently indicate a $SO_3(M1)$; and
said blue color element includes at least one coloring matter of formulae (B1) or (B2):

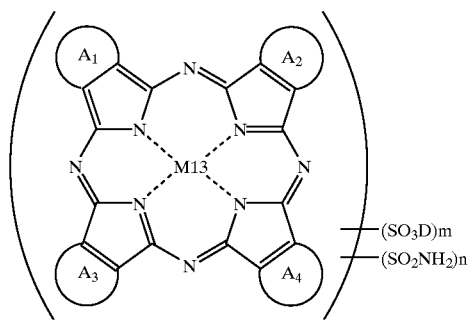

(B1)

wherein m denotes an integer of 1 to 4 and n denotes an integer of 0 to 3 (with the proviso that m+n denotes an integer of 1 to 4);

$A_1$ to $A_4$ independently denote an aromatic ring that may be substituted by a halogen atom, a nitro group, an alkyl group, an aryl group, an alkoxy group, a sulfonic group, or a sulfonamide group; or a nitrogen-containing heteroaromatic ring that may be substituted by a sulfonic group or a sulfoamide group (with the proviso that at least one of $A_1$ to $A_4$ denotes a nitrogen-containing heterocycle);
M13 denotes two hydrogen atoms, a divalent metal, or a trivalent or tetravalent metal derivative; and
D denotes a monovalent alkaline metal or $NH_4$; and

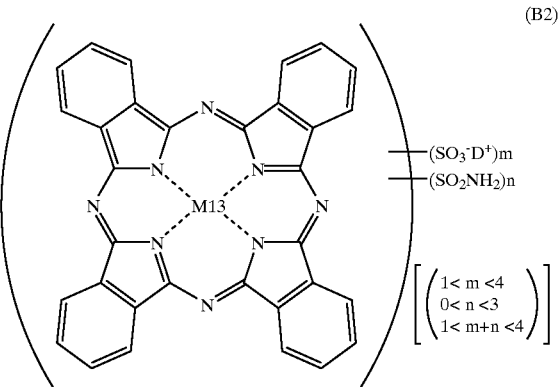

(B2)

wherein m and n are integers such that 1<m<4 and 0<n<3 (with the proviso that 1<m+n<4);
D independently denotes an alkaline metal or ammonium; and
M14 denotes two hydrogen atoms or a divalent metal having a substituent, or a trivalent or tetravalent metal derivative.

8. A method for manufacturing a color filter according to claim 7, comprising the steps of:
selecting as said red, green and blue coloring matters inks which are suitable for ink jet recording; and
ejecting each color ink toward a surface of a light-transmissible substrate using the ink jet process at predetermined positions on the substrate, wherein
the red, green, and blue color elements are formed on the light-transmissible substrate to have a relationship between a tristimulus value (Y) of a white color synthesized by the red, green, and blue color elements and an area (S) for a triangle formed by connecting the xy chromaticity coordinate in a standard C light source of the above color elements each obtained based on a XYZ color system with a 2° visual field (JIS Z8701) satisfies the relationship Y>−255*S+54.

9. A liquid crystal display panel comprising: a color filter having red, green, and blue color elements, the color filter ensuring that a relationship between a tristimulus value (Y) of a white color synthesized by the color elements and an area (S) for a triangle formed by connecting the xy chromaticity coordinate in a standard C light source of said each color element obtained based on a XYZ color system with a 2° visual field (JIS Z8701) meets Y≧−255*S+54; and a panel substrate disposed opposite to the color filter, a liquid crystal compound being sealed between the color filter and the panel substrate.

10. The liquid crystal display panel as claimed in claim 9, wherein said relationship between Y and S meets the condition of Y≧−255*S+54.5.

11. The liquid crystal display panel as claimed in claim 10, wherein said relationship between Y and S meets the condition of Y≧−255*S+55.

12. The liquid crystal display panel as claimed in claim 11, wherein said relationship between Y and S meets the condition of $Y \geq -255*S+55.5$.

13. The liquid crystal display panel as claimed in claim 12, wherein said relationship between Y and S meets the condition of $Y \geq -255*S+56$.

14. The liquid crystal display panel as claimed in claim 9, wherein the color elements each include a dye.

15. The liquid crystal display panel as claimed in claim 9, wherein said red color element includes at least one coloring matter of structural formulae (R1-1) or (R1-2) and at least one coloring matter of structural formulae (R2-1) or (R2-2):

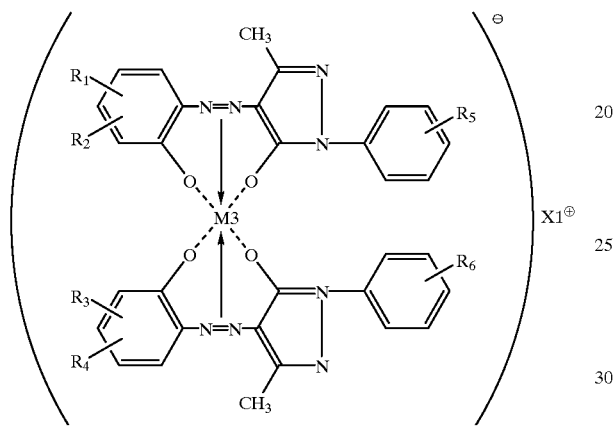
(R1-1)

wherein $R_1$, $R_2$, $R_3$, and $R_4$ independently denote a hydrogen atom, a halogen atom, a nitro group, a $C_{1-5}$ alkyl group, $CF_3$, or $SO_3(M1)$ group (wherein M1 indicates a monovalent alkaline metal or $NH_4$);

$R_5$ and $R_6$ independently denote a hydrogen atom, a halogen atom, or $SO_3(M1)$;

M3 denotes Cr, Ni, or Co; and $X1^+$ denotes a monovalent alkaline metal cation or $NH_4^+$;

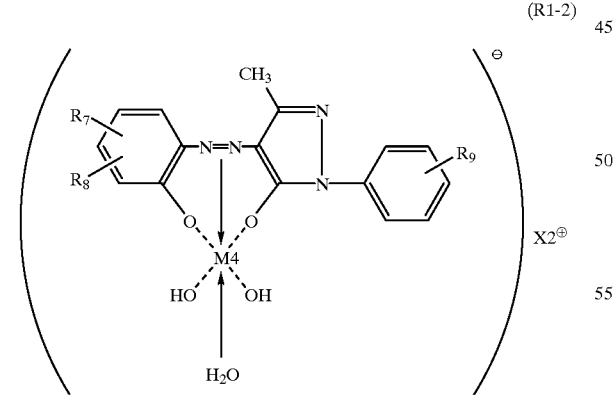
(R1-2)

wherein $R_7$ and $R_8$ independently denote a hydrogen atom, a halogen atom, a nitro group, a $C_{1-5}$ alkyl group, $CF_3$, or $SO_3(M1)$;

$R_9$ denotes a hydrogen atom, a halogen atom, or $SO_3(M1)$;

M4 denotes Cu or Cr; and $X2^+$ denotes a monovalent alkaline metal cation or $NH_4^+$;

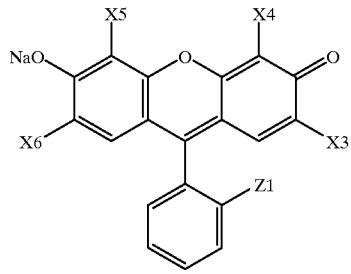
(R2-1)

wherein $X_3$ to $X_6$ independently denote a halogen atom; and

Z1 denotes —COO(M1) or a —$SO_3^-$ group; and

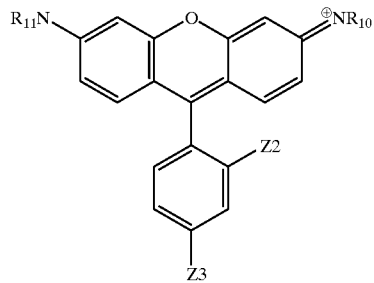
(R2-2)

wherein $R_{10}$ and $R_{11}$ independently denote a halogen atom, a linear or branched $C_{1-5}$ alkyl group; or a substituted or unsubstituted aryl group; and Z2 and Z3 independently denote a —COO(M1) or a —$SO_3^-$ group;

said green color element includes at least one coloring matter of structural formulae of (G1), (G2), (G3) or (G4):

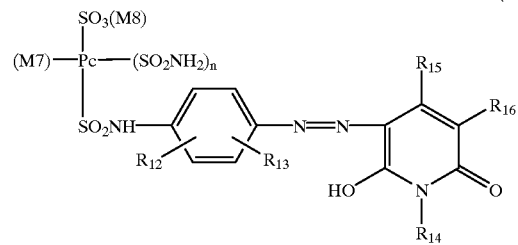
(G1)

wherein Pc indicates a phthalocyanine backbone;

(M7) indicates Cu, Zn, or Ni;

(M8) indicates a monovalent alkaline metal or $NH_4^+$;

$R_{12}$ and $R_{13}$ independently indicate a hydrogen atom, $SO_3(M1)$, a substituted or unsubstituted amide group, or a substituted or unsubstituted alkyl group;

$R_{14}$ and $R_{15}$ independently indicate a substituted or unsubstituted alkyl group;

$R_{16}$ indicates —$CONHR_{17}$, —COOH, or —COO(M1);

$R_{17}$ indicates a hydrogen atom or a substituted or unsubstituted alkyl group; and n indicates 0, 1, or 2;

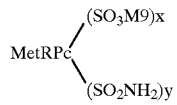

(G2)

wherein Met denotes a divalent, trivalent, or tetravalent metal ion, or two hydrogen atoms;

RPc denotes a phthalocyanine residue having 1 to 8 phenyl groups;

M9 denotes a hydrogen atom, an alkaline metal, or an ammonium ion; and x denotes an integer of 1 to 8 and y denotes an integer of 0 to 7 (with the provisos that x+y<8 and when Met denotes a trivalent or tetravalent metal ion, one or two ligands exist, respectively);

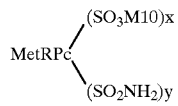

(G3)

wherein Npc denotes a naphthalocyanine residue;

M10 denotes a hydrogen atom, an alkaline metal, or an ammonium ion; and x denotes an integer of 1 to 4 and y denotes an integer of 0 to 3 (with the provisos that $x+y \leq 4$ and when Met denotes a trivalent or tetravalent metal ion, one or two ligands exist, respectively); and

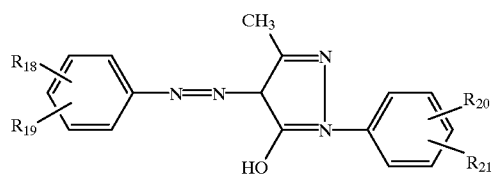

(G4)

wherein $R_{18}$ and $R_{19}$ independently indicate a hydrogen atom, a OH group, a halogen atom, a linear or branched $C_{1-5}$ alkyl group, a nitro group, $CF_3$, a $SO_3(M1)$; and $R_{20}$ and $R_{21}$ independently denote $SO_3(M1)$; and said blue color element includes at least one coloring matter represented by formulae (B1) or (B2):

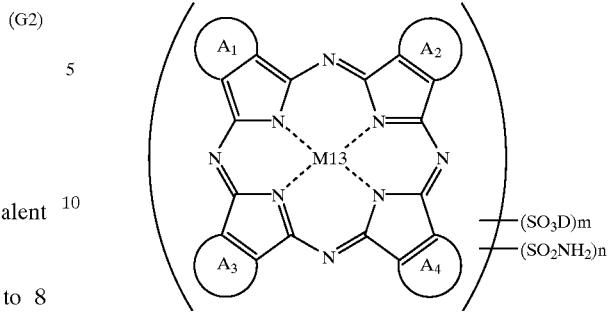

(B1)

wherein m denotes an integer of 1 to 4 and n denotes an integer of 0 to 3 (with the proviso that m+n denotes an integer of 1 to 4);

$A_1$ to $A_4$ independently denote an aromatic ring that may be substituted by a halogen atom, a nitro group, an alkyl group, an aryl group, an alkoxy group, a sulfonic group, or a sulfoamide group; or a nitrogen-containing aromatic ring that may be substituted by a sulfonic group or a sulfoamide group (with the proviso that at least one of $A_1$ to $A_4$ denotes a nitrogen-containing heterocycle);

M13 denotes two hydrogen atoms or a divalent metal, or a trivalent or tetravalent metal derivative; and D denotes a monovalent alkaline metal or $NH_4$; and

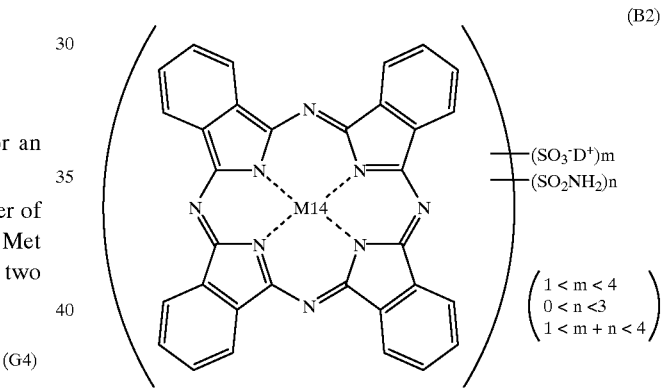

(B2)

wherein m and n are integers such that 1<m<4 and 0<n<3 (with the proviso that 1<m+n<4);

D independently denotes an alkaline metal or ammonia; and

M14 denotes two hydrogen atoms or a divalent metal having a substituent, or a trivalent or tetravalent metal derivative.

16. The liquid crystal display panel as claimed in claim 9 comprising an electrode for controlling orientation of the liquid crystal compound on a face opposite to the side having the color elements of the light-transmissible substrate of the color filter.

17. A computer comprising a liquid crystal panel as claimed in any of claims 9 to 16 as an image display section.

* * * * *

UNITED STATES PATENT AND TRADEMARK OFFICE
CERTIFICATE OF CORRECTION

PATENT NO.    : 6,238,827 B1
DATED         : May 29, 2001
INVENTOR(S)   : Koichiro Nakazawa et al.

It is certified that error appears in the above-identified patent and that said Letters Patent is hereby corrected as shown below:

Column 2,
Line 3, "clolring" should read -- coloring --.

Column 5,
Line 2, "sulfoamide" should read -- sulfonamide --;
Line 4, "sulfoamido" should read -- sulfonamide --;
Line 39, "Y$\leq$-255*S+54," should read -- Y$\geq$-255*S+54, --; and
Line 66, "chromaticy" should read -- chromaticity --.

Column 6,
Line 29, "satisfys" should read -- satisfies --.

Column 8,
Line 55, "chorine" should read -- chlorine --.

Column 9,
Line 41, "chorine" should read -- chlorine --.

Column 10,
Line 18, "chorine" should read -- chlorine --; and
Line 20, "SO3" should read -- $SO_3$ --.

Column 13,
Line 40, "metter" should read -- matter --.

Column 15,
Line 63, "becomes" should read -- become --.

Column 17,
Line 18, "dissolving" should read -- dissolve --; and
Line 36, "pottasium" should read -- potassium --.

Column 18,
Line 58, "dissolving" should read -- dissolve --.

UNITED STATES PATENT AND TRADEMARK OFFICE
CERTIFICATE OF CORRECTION

PATENT NO. : 6,238,827 B1
DATED : May 29, 2001
INVENTOR(S) : Koichiro Nakazawa et al.

It is certified that error appears in the above-identified patent and that said Letters Patent is hereby corrected as shown below:

Column 19,
Line 8, "sulfurisc" should read -- sulfuric --.

Column 20,
Line 25, "process" should read -- processes --.

Column 21,
Line 54, "denote" should read -- denotes --; and
Line 57, "sulfoamide" should read -- sulfonamide --.

Column 22,
Line 56, "independenly" should read -- independently --;
Line 57, "denote" should read -- denotes -- and "sulfoamide" should read
-- sulfonamide --; and
Line 59, "denote" should read -- denotes --.

Column 23,
Line 5, "Pb." (1st occurrence) should be deleted.

Column 26,
Line 11, "denote" should read -- denotes --; and
Line 28, "denote" should read -- denotes --.

Column 27,
Line 48, "amount" should read -- amounts --.

Column 29,
Line 51, "becomes" should read -- become --.

Column 30,
Line 3, "stps" should read -- steps --.

Column 31,
Line 3, "a-methyl" should read -- $\alpha$-methyl --;
Line 43, "perform" should read -- performing --; and
Line 44, "thereby" should read -- whereby --.

UNITED STATES PATENT AND TRADEMARK OFFICE
CERTIFICATE OF CORRECTION

PATENT NO. : 6,238,827 B1
DATED : May 29, 2001
INVENTOR(S) : Koichiro Nakazawa et al.

It is certified that error appears in the above-identified patent and that said Letters Patent is hereby corrected as shown below:

Column 32,
Line 12, "absorptibity" should read -- absorptivity --;
Line 19, "absorptibity" should read -- absorptivity --;
Line 30, "include" should read -- includes --; and
Line 51, "absorptibity" should read -- absorptivity --.

Column 33,
Line 11, "thereby" should read -- whereby --.

Column 34,
Line 21, "obtained" should read -- obtain --; and
Line 46, "pattering" should read -- patterning --.

Column 35,
Line 23, "of" should be deleted; and
Line 30, "Methymethacrylte," should read -- Methylmethacrylate, --.

Column 37,
Line 36, "to" should be deleted.

Column 38,
Line 54, "pthe" should read -- the --.

Column 39,
Line 3, "filer" should read -- filter --; and
Line 33, "$C_{1-5}$," should read -- $C_{1-5}$ --.

Column 41,
Line 30, "$x+y \geqq 4$" should read -- $x+y \leqq 4$ --.

Column 42,
Line 5, "sulfoamide" should read -- sulfonamide --.

UNITED STATES PATENT AND TRADEMARK OFFICE
CERTIFICATE OF CORRECTION

PATENT NO.   : 6,238,827 B1
DATED        : May 29, 2001
INVENTOR(S)  : Koichiro Nakazawa et al.

It is certified that error appears in the above-identified patent and that said Letters Patent is hereby corrected as shown below:

Column 46,
Line 21, "sulfoamide" should read -- sulfonamide --; and
Line 23, "sulfoamide" should read -- sulfonamide --.

Signed and Sealed this

Sixteenth Day of July, 2002

Attest:

Attesting Officer

JAMES E. ROGAN
*Director of the United States Patent and Trademark Office*